United States Patent [19]

Yoshimura et al.

[11] Patent Number: 5,102,226
[45] Date of Patent: Apr. 7, 1992

[54] OPTICAL MEASUREMENT SYSTEM FOR DETERMINATION OF AN OBJECT PROFILE

[75] Inventors: Kazunari Yoshimura, Hirakata; Shinji Okamoto, Yawata, both of Japan

[73] Assignee: Matsushita Electric Works, Ltd., Osaka, Japan

[21] Appl. No.: 463,579

[22] Filed: Jan. 11, 1990

[30] Foreign Application Priority Data

Jan. 12, 1989 [JP] Japan .................. 1-5650
Aug. 12, 1989 [JP] Japan .................. 1-208326

[51] Int. Cl.⁵ .................. G01B 11/24; H01J 5/16
[52] U.S. Cl. .................. 356/376; 250/227.28; 250/227.32
[58] Field of Search .................. 356/375, 376, 380; 250/555, 227.32, 560, 227.28

[56] References Cited

U.S. PATENT DOCUMENTS

| | | | |
|---|---|---|---|
| 3,612,888 | 10/1971 | Bocher | 250/227.28 |
| 3,737,629 | 6/1973 | See | 250/227.28 |
| 3,906,220 | 9/1975 | Delingat | 250/227.28 |
| 4,627,734 | 12/1986 | Rioux | 356/376 |
| 4,830,485 | 5/1989 | Penney et al. | 250/227.32 |

FOREIGN PATENT DOCUMENTS

| | | | |
|---|---|---|---|
| 3315576 | 10/1984 | Fed. Rep. of Germany | 356/375 |
| 0190812 | 9/1985 | Japan | 356/375 |
| 0020409 | 1/1989 | Japan | 356/375 |

*Primary Examiner*—Richard A. Rosenberger
*Assistant Examiner*—Hoa Pham
*Attorney, Agent, or Firm*—Armstrong, Nikaido, Marmelstein, Kubovcik & Murray

[57] ABSTRACT

An optical object profile measurement system utilizes a light beam to scan an object surface and a position detector which receives a light beam reflected from the object surface to obtain position data of individual scanned points on the object surface. The position data is processed to determine a profile of the object profile along the scanned points. The position detector comprises a number of light receiving elements arranged in at least two linear arrays each extending in the direction of following the light beam moving across the object surface and is divided into subdivisions having one or more of the light receiving elements. The arrays are disposed side-by-side to receive the light beam. In a first one of the arrays, the light receiving elements are designated by first values which have differing subdivisions such that the elements designated by the same first value are coupled to provide a single first output when any one of such elements detects the light beam. In a second one of the arrays, the light receiving elements are designated by the second values which are different within each subdivision but are common to those of the other subdivisions such that the elements designated by the same second values are coupled to provide a single second output when any one of such elements detects the light beam. The first and second values are combined to provide the position data in a coded form for surface profile analysis.

13 Claims, 17 Drawing Sheets

Fig.12
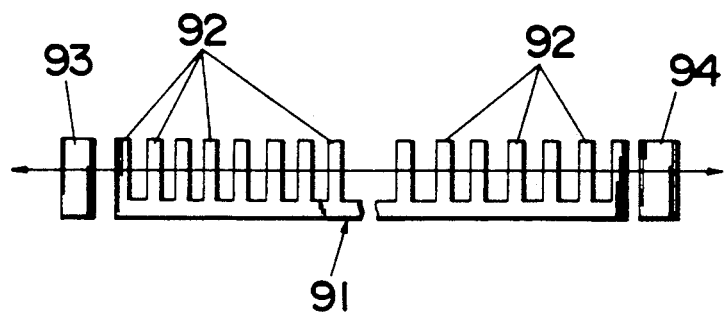
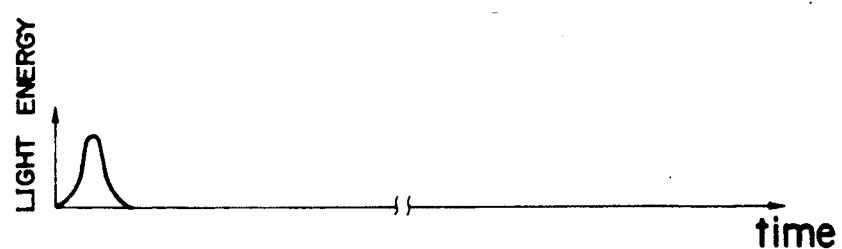
Fig.13A
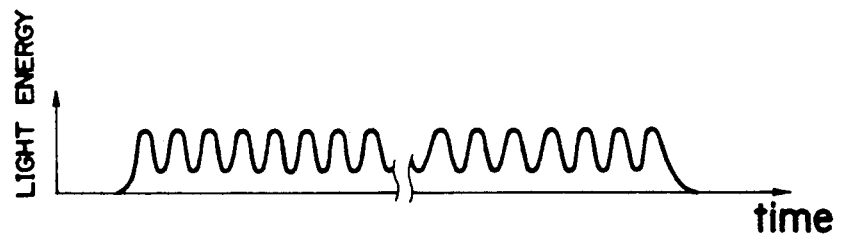
Fig.13B
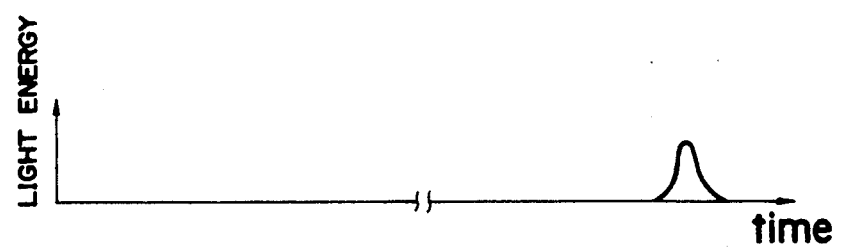
Fig.13C

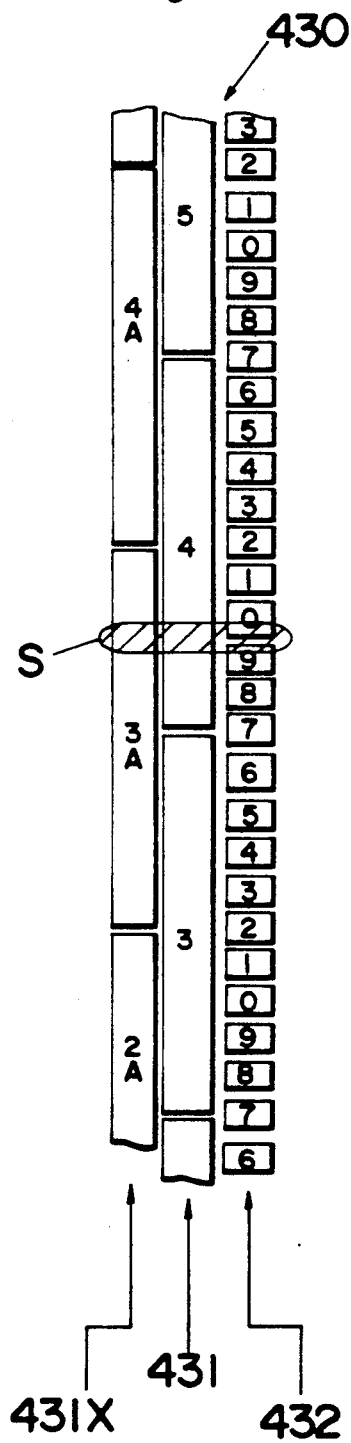

OPTICAL MEASUREMENT SYSTEM FOR DETERMINATION OF AN OBJECT PROFILE

BACKGROUND OF THE INVENTION

1. Field of the Invention

The present invention is directed to an optical measurement system for determination of an object profile, and more particularly to a system for determination of the object profile based upon position data of scanned points on the object surface.

2. Description of the Prior Art

There has been known in the art an optical measurement system for determination of an object profile based upon the position data on the object surface, for example, as disclosed in Japanese Patent Publication (KOKOKU) No. 61-51722. The system utilizes a light beam such as a laser beam directed to the object surface as being oscillated to scan the object surface. The reflected oscillating light beam is constantly monitored by a detector positioned at a fixed distance from a source of the light beam. The detector then measures by triangulation individual distances to successively scanned points on the object surface to thereby obtain position data with regard to the individual scanned points. Thus obtained distances, which represent a series of height data of the scanned points in relation to a reference plane generally perpendicular to a plane including axes of the light beams incident to and reflected from the object surface, are processed to provide a profile of the object along the scanned points. In the prior system, the detector is configured to have a number of light sensitive elements or photo-detectors such as photo-diodes arranged in a single array extending in the direction of following the reflected light beam from the object surface such that each of the elements can provide an output when sensing the light beam or light energy thereof, which output is therefore indicative of the position of the particular scan point on the object surface at a given time. With this array arrangement of the light sensitive elements having the individual outputs, however, the prior system is required to examine the individual outputs from the elements for providing the position data of the scanned points. Consequently, when it is desired to increase resolution or to have a wide dynamic range by adding more light sensitive elements, the system has to process a correspondingly increased number of outputs from the individual elements with attendant complexity in circuit configuration, which places a severe limitation to increasing resolution or dynamic range of measurement. It is therefore highly desired that the system be configured to have an increased number of the light sensitive elements for increased resolution and dynamic range while reducing the number of the outputs from the elements to be processed.

Another prior art system is known to utilize a camera or a line sensor for obtaining the like position data of the object surface as disclosed, for example, in Japanese Patent Early Publication (KOKAI) No. 58-77609. However, such system is found to suffer from a relatively low processing speed and narrow dynamic range, which renders the system impractical where high processing speed and reliable measurement are of primary concerns.

SUMMARY OF THE INVENTION

The above problem has been eliminated in the present invention which provides an improved optical system for determination of an object profile. The system utilizes a light source for emitting a light beam such as a laser beam which is directed to an object surface for scanning thereof. A position detector is disposed to receive a reflected light beam from the object surface in order to obtain position data with respect to the scanned points on the object surface. The position data is processed to provide a series of distances to the individual scanned points by triangulation, which distances are related to individual height data of the scanned point from a horizontal plane generally perpendicular to a plane including the axes of the light beam directed to and reflected from the object surface and are analyzed for determination of an object profile along the scanned points. In the present invention, the position detector comprises a number of light receiving elements which are arranged in at least two linear arrays which extend in the direction of following the reflected light beam and are disposed in side-by-side relation such that the light beam from the scanned points can straddle over the linear arrays. Each of the linear arrays is divided into plural subdivisions having a definite number of the light receiving elements. In a first one of the linear arrays, the light receiving elements are designated by a first value which is common to each of the subdivisions but is different from the differing subdivisions, and the light receiving elements designated by the same first value are commonly coupled to provide a single first output signal when any one of the elements receives the light beam of significant energy level. In a second one of the linear arrays the light receiving elements are designated by a second value which is different within each subdivision but is common to each other between the different subdivisions, and the light receiving elements designated by the same second value are commonly coupled to provide a single second output when any one of the elements receives the light beam of significant energy level. The first and second outputs are combined to produce a coded signal comprising the first and second values. It is this coded signal that represents a beam spot formed on the arrays by the light beam from the scanned points and therefore defines the above position data with regard to the individual scanned points. That is, a particular beam spot within the length of the array can be represented by the coded signal. With this arrangement of commonly coupling the light receiving elements in the first and second arrays in a suitable combination to provide the respective first and second outputs, the number of the first and second outputs to be processed for obtaining the position data can be made considerably less than the total number of the light receiving elements. That is, the number of the outputs from the elements which are to be processed is defined to be the sum of the number of the subdivisions in the first array plus the number of the elements only in one subdivision of the second array, and therefore can be considerably smaller than the number of the elements required for covering the entire length of the array. Consequently, the operation of processing the outputs from the light receiving elements can be made by a relatively simple circuit configuration and therefore at a rapid processing speed, while assuring high resolution as well as a wide dynamic range. In other words, it is possible by the present invention to enhance the resolution and dynamic range of measurement while retaining the number of the outputs from the elements to be processed at a minimum.

Accordingly, it is a primary object of the present invention to provide an improved optical measurement system which is capable of determining an object profile in a simple configuration and therefore at an increased processing speed, while assuring high resolution as well as wide dynamic range of the measurement.

In one embodiment of the present invention, the position detector is configured to have the first and second arrays which are divided into the corresponding subdivisions of equal length. The subdivisions of the first array are each composed of a single photo-detector having an elongated light receiving element covering the entire length of the subdivision, while the subdivisions of the second array are each composed of a plurality of photo-detectors each having a small light receiving element. In the first array, each photo-detector defining each one of the subdivisions is to provide an individual first output indicative of the particular subdivision receiving the light beam from the object surface. In the second array, the photo-detectors which are designated by the same second value, are collectively coupled to provide a single second output when any one of the photo-detectors so designated receives the light beam of a significant energy level. The first and second outputs are combined to present a coded signal which indicates an exact location or beam spot of the light beam received. It is therefore another object of the present invention to provide an optical measurement system for determination of an object profile which utilizes photo-detectors having the light receiving elements of differing dimensions for the first and second arrays while keeping the number of the outputs from the first and second arrays at a minimum.

In a preferred embodiment, the position detector is designed to include optical fibers each defining at its one end face or plane the light receiving element and coupled at its other end face to a photo-detector. The optical fibers are so arranged that the individual one end faces constitute the first and second arrays while the other end faces of the optical-fibers are suitably grouped for coupling to the photo-detectors provided in less number than the optical-fibers. The first array can have the subdivisions each including a plurality of the light receiving elements (i.e., the end faces of the optical-fibers), in much the same way as the second array can have a number of the light receiving elements. In this embodiment, the optical-fibers forming the same subdivision of the first array, or designated by the same first value, are commonly coupled to a single photo-detector which provides the first output when any one of the end faces of the optical fibers thus designated receives the light beam. Likewise, the optical fibers designated by the same second value in the second array are commonly coupled to a single second photo-detector which provides a second output when any one of the end planes of the optical fibers thus designated receives the light beam. With the provision of the optical fibers which define the light receiving elements respectively at their one end faces and which are collectively coupled to suitable ones of the photo-detectors, the total number of the photo-detectors can be also reduced to further simplify the system configuration, yet assuring high resolution and wide dynamic range of measurement.

It is therefore a further object of the present invention to provide an improved optical measurement system for determination of an object profile which is capable of reducing the number of the photo-detectors without any sacrifice in resolution and dynamic range of the measurement.

Basically, a maximum light energy is considered in order to exclude spurious light beam or erroneous reflections redirected from other than the object surface and to exactly judge which light receiving element receives the desired light beam directly from the object surface. Nevertheless, when the light beam from the object surface produce a beam spot extending over the adjacent subdivisions in the first array in such a manner as to make it difficult to identify which subdivision of the first array has to be combined with one or ones of the particular elements in the second array for indication of a correct beam spot. In this condition, consequently, it is most likely to produce an erroneous combination of the first and second outputs which indicates a false beam spot spaced from a true scan spot by as much as one length of the subdivision of the first array. For eliminating this false combination, the system of the present invention is configured to judge which one of the subdivisions of the first array has to be combined with one or ones of the light receiving elements in the second array based upon a particular location or second value of the light receiving element in the second array detecting maximum light energy. Thus, the exact location of the beam spot can be obtained reliably in the coded signal comprising the first and second outputs from the corresponding elements of the first and second arrays respectively, even when the light beam comes around the boundary between the adjacent subdivisions of the first array.

It is therefore a still further object of the present invention to provide an improved optical measurement system which eliminates the erroneous combination of the first and second outputs and provides consistent position data in the coded form for reliable determination of the object profile.

It is preferred in the optical system of the present invention to direct the reflected light beam from the object surface without being interrupted by the presence of an obstacle adjacent the object and therefore provide an exact image of the object surface for reliable measurement thereof. To this end, the present invention may include a pair of mirrors which are disposed on the opposite sides of an axis of light beam incident to the object surface for providing a pair of opposed first and second mirror images of the object. The first image is reversed and overlapped on the second image to provide a composite image which is focused on the arrays of the position detector for determination of the object profile. Consequently, even if an obstacle is present on one side of the object to interrupt the one of the first and second image, the remaining one of the first and second images provides a correct image of the object to enable a reliable measurement based thereon. Also because of that the first and second images are overlapped to form the composite image, only one position detector is enough so as not to unduly complicate the system.

It is therefore a further object of the present invention to provide an improved optical measurement system which is capable of determining an object profile even in the presence of an obstacle adjacent the object only with the use of one position detector.

For scanning the object surface, the light beam is directed to the object surface by way of a first oscillating mirror which oscillates the light beam on the object surface. A second oscillating mirror, which oscillates in synchronism with the first oscillating mirror, is positioned to redirect the reflected light beam from the object surface toward the position detector so that the position detector can follow the scanned points on the object surface. A beam splitter is positioned to reflect part of the light beam directed toward the object surface. The split part of the light beam is monitored by a scan spot tracing sensor which provides a timing signal indicating an instantaneous horizontal position of the scanned points and therefore provides a horizontal scale of the scanned points on the object surface. The timing signal is associated with the above height data obtained with respect to the individual scanned points so as to distribute or calibrating the height data along the horizontal scale, whereby determining a contour or profile of the object surface along the scanned points. The scan spot tracing sensor comprises a number of photo-detectors which are spaced at suitable intervals in a comb-teeth configuration so as to correctly detect the instantaneous position of the oscillating light beam at the individual photo-detectors, thereby providing a consistent timing signal in exact coincidence with the oscillation of the light beam on the object surface for reliable determination of the object profile.

It is therefore an object of the present invention to provide an improved optical measurement system which is capable of determining an object profile in a reliable manner by exactly associating the height data of the scanned points with the horizontal scale of the scanned points.

In a preferred embodiment of the present invention, the light beam from the object surface is divided into separate light beams which are focused respectively on suitably spaced arrays such that each of the arrays can always receive the light beam and will not miss the light beam. In other words, the arrays can be properly spaced in such a manner as to exclude secondary or the like erroneous reflections which might otherwise confuse the measurement and fail to provide a reliable result. For this purpose, it is preferred that the second oscillating mirror be designed to have separate mirror surfaces of different angular orientations which correspond in number to that of the spaced arrays for focusing the separate light beams to the individual arrays. With this arrangement, it is possible to route the individual light paths in an optimum manner to exclude erroneous factors and to assure reliable measurement at the position detector, which is therefore a further object of the present invention.

These and still other objects and advantages will become more apparent in the following description of the preferred embodiments when taken in conjunction with the attached drawings.

BRIEF DESCRIPTION OF THE DRAWINGS

FIG. 12 is a schematic view illustrating an array of photo-detectors forming the above scan point tracing sensor;

FIG. 13, composed of FIGS. 13A to 13C, is a chart illustrating the operation of the scan point tracing sensor;

FIG. 30 is a schematic view illustrating an array arrangement of a position detector in accordance with a further modification of the above third embodiment.

DETAILED DESCRIPTION OF PREFERRED EMBODIMENTS

First embodiment

Figure 1:
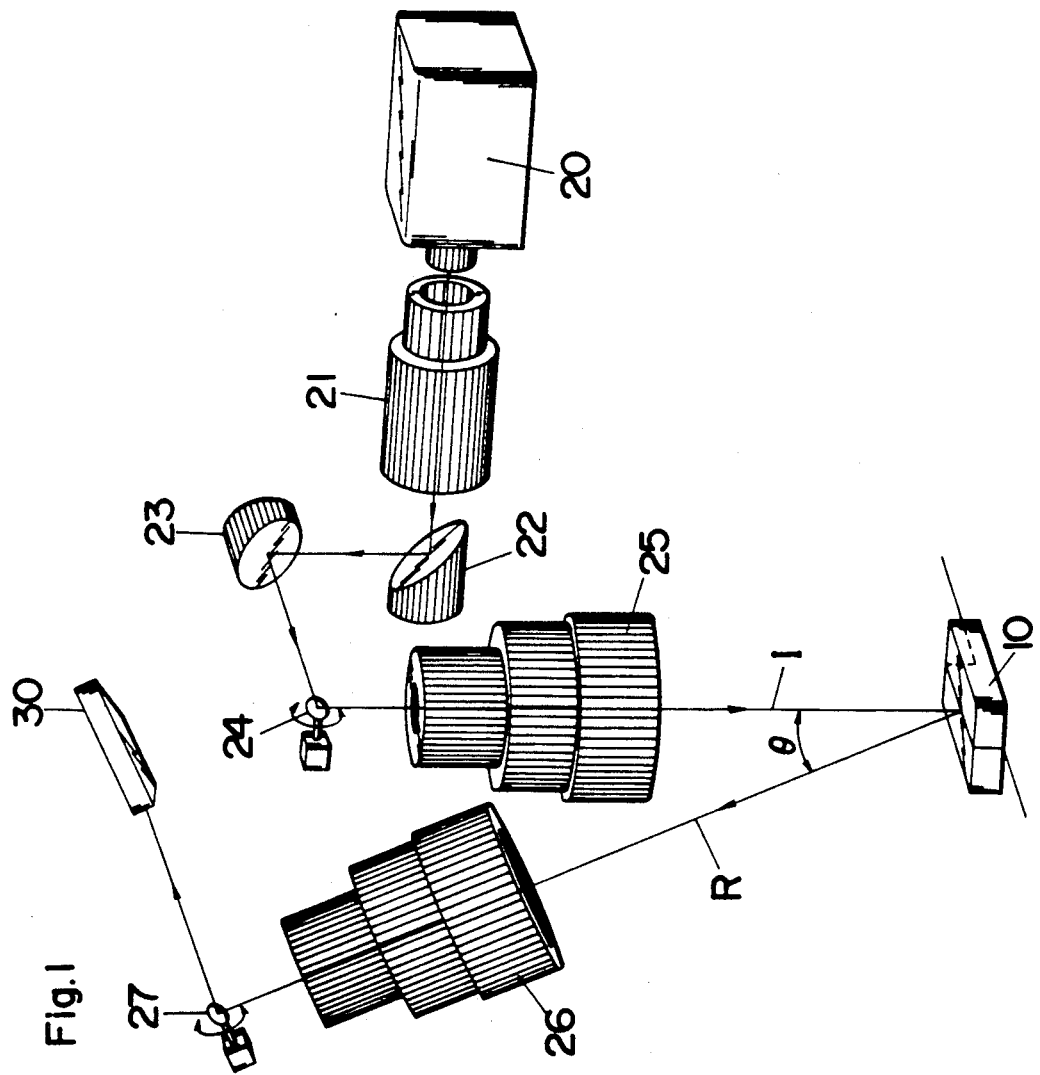
FIG. 1 is a schematic view illustrating an optical measurement system in accordance with a first embodiment of the present invention.

Referring now to FIG. 1, there is illustrated an optical measurement system for determination of an object profile in accordance with a first embodiment of the present invention. The system utilizes a light beam I directed to an object 10 for scanning the object surface and a position detector 30 which monitors a reflected light beam R from the object surface. During the scanning operation of moving the light beam I across the object surface, the detector 30 acknowledges a change in an incidence of angle of the reflected light beam R as a corresponding position change in light receiving spots (hereinafter referred to as beam spots) in the detector 30 and produces a position signal indicative of the varying angle of incidence of the reflected light beam R. The position signal is processed to measure instantaneous distances to individual scan points on the object surface by triangulation, which distances are therefore related to individual height dimensions of the scanned points from a reference plane which is generally perpendicular to a plane including the light beams directed and reflected to and from the object. Thus measured distances are then analyzed in a suitable circuitry to provide a profile of the object surface along the scanned points.

The system comprises a light source 20 emitting a laser beam as the light beam which is directed through a beam expander 21 to the object 10, a pair of optical path adjusting mirrors 22 and 23, a first oscillating mirror 24, and a first focusing lens 25. The light beam reflected from the object surface is directed through a second focusing lens 26, a second oscillating mirror 27, and enters the position detector 30 where it is examined to obtain the above-mentioned position signal with regard to the individual scanned points on the object surface. The first oscillating mirror 24 is provided to oscillate the light beam for scanning the object surface. The second oscillating mirror 27 oscillates in synchronism with the first oscillating mirror 24 to redirect the oscillating reflected light beam from the object surface to the position detector 30. The first oscillating mirror 24 is positioned at one focal point of the first focusing lens 25 such that the light beam after passing through the first focusing lens 25 will oscillate with its axis kept in parallel with an optical axis of the lens 25, whereby enabling to scan the object surface without causing any substantial dead spot on the object surface. The first focusing lens 25 has the other focal point coincident with the object surface for enhanced resolution. Similarly, the second focusing lens 26 has its focal points coincident respectively with the object 10 and with the second oscillating mirror 27. The second focusing lens 26 has its axis inclined at an angle $\theta$ of 30° from the axis of the first focusing lens 25 or the light beam I incident to the object 10. The second focusing lens 26 is spaced from the object 10 by such a distance to obtain a 1.6 magnification.

Figure 2:
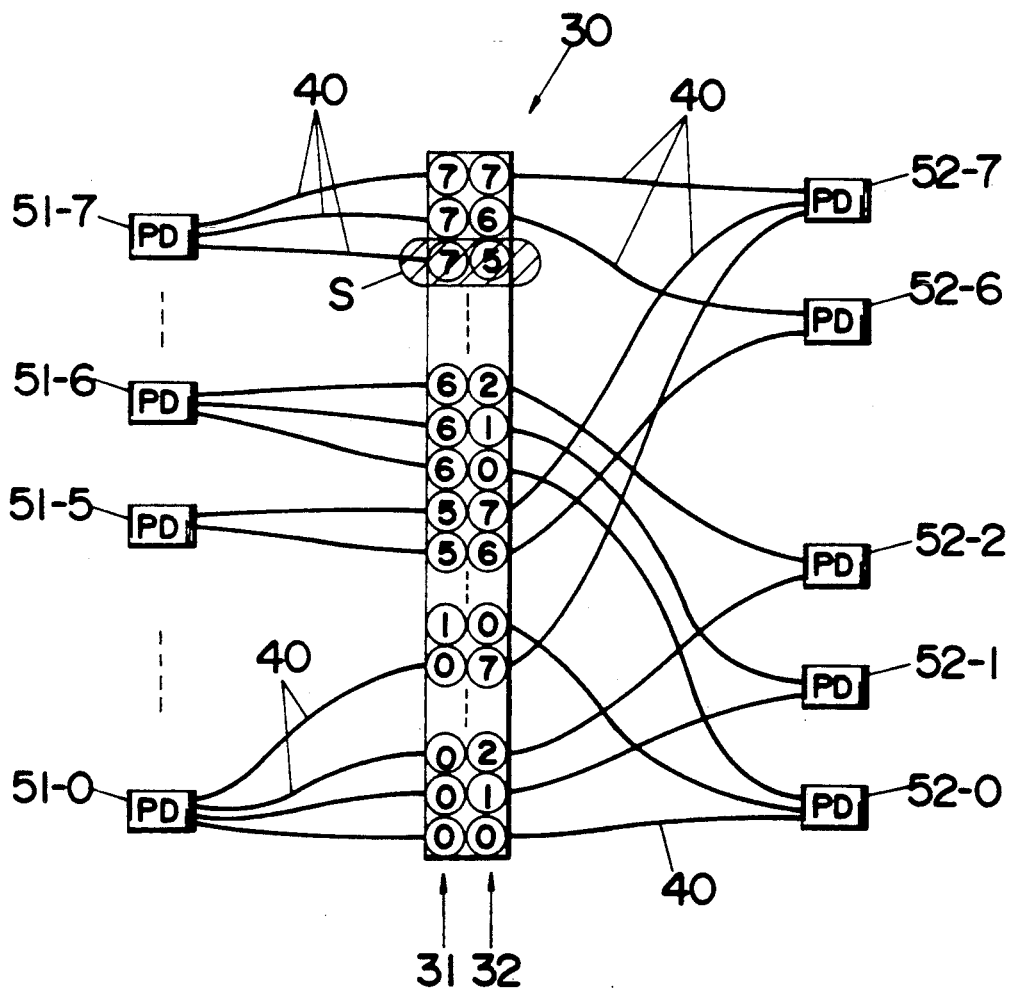
FIG. 2 is a schematic view illustrating a position detector utilized in the above system and comprising a number of light receiving elements arranged in two arrays.

As shown in FIG. 2, the position detector 30 comprises a number of optical-fibers 40 each defining each one of the light receiving elements (indicated by numbered circles) at its one end and coupled at the other end to suitable one of photo-detectors 51 and 52. As will be described hereinafter, the optical-fibers 40 are grouped according to a particular pattern and coupled to suitable ones of the photo-detectors. The light receiving elements are arranged in first and second arrays 31 and 32 which extend in the direction of following the oscillating light beam R reflected from the object 10 in side-by-side relation. It is noted at this time that the beam expander 21 is responsible to form such a flattened or enlarged beam spot S as to straddle over the elements in the first and second arrays 31 and 32, as indicated by the hatched area in the figure.

Each of the first and second arrays 31 and 32 is divided into eight (8) subdivisions including the equal number (8) of the elements. As seen in the figure, the elements in the first array 31 are designated by numerals, i.e., "0" to "7", which are equal within the same subdivision but are different from the differing subdivisions. The elements in each subdivision or those designated by the same numerals in the first array 31 are collectively coupled to each one of the photo-detectors 51-0 to 51-7 which provides a first output representative of a total amount of energy received at the corresponding elements. On the other hand, the elements in the second array 32 are grouped differently in such a manner that the elements in each subdivision are designated by different numerals, i.e., "0" to "7". The elements designated by the same numerals in the second array 32 are collectively coupled to each one of the photodetectors 52-0 to 52-7 which provides a second output representative of a total amount of light energy received at the corresponding elements of the same numerals.

The outputs from the first and second photo-detectors 51 and 52 are processed to provide the above position signal in a coded form comprising two digits, the high digit being the numerals designating the elements in the first array 31 receiving the light beam and the low digit being the numerals designating the element in the second array 32 receiving the light beam. For instance, when the reflected light beam is focused in the array to form the beam spot S at the illustrated position, a coded signal "75" is issued as a result of that the first photo-detector 51-7 responds to provide the first output representative of numeral "7" and the second photo-detector 52-5 provides the second output indicative of numeral "5". This means that the position detector 30 can acknowledge that the light beam is received at the 62nd ($7 \times 8 + 6$) element as counted from below of the illustrated arrays. In this manner, a particular beam spot S on the array can be identified by the coded signal. It should be noted in this connection that the illustrated arrays provides a resolution of 64 ($8 \times 8$) spots, yet only requiring as little as sixteen ($8+8$) photodetectors for identification of the beam spot S.

Figure 3:
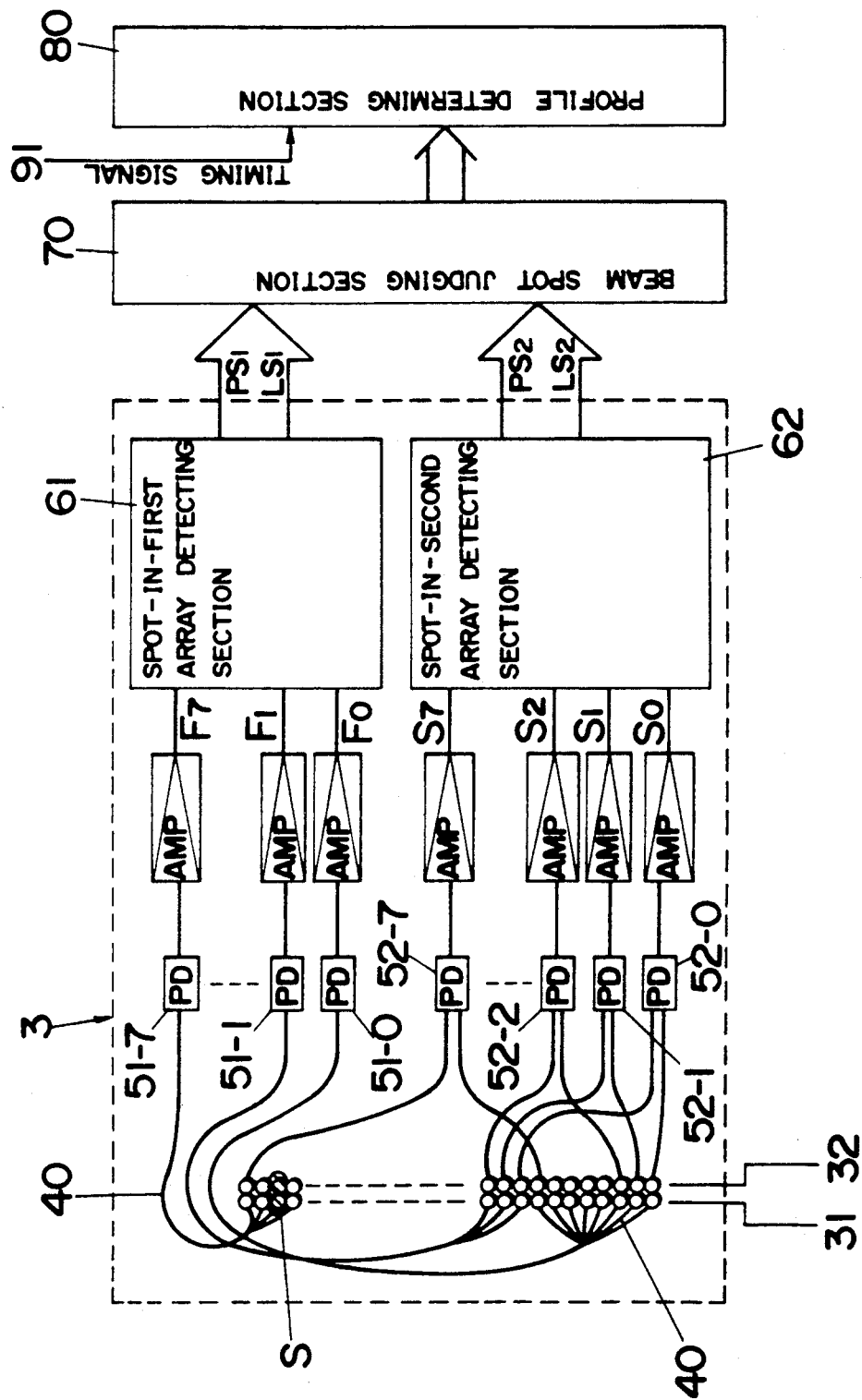
FIG. 3 is a schematic block diagram of the above system.

FIG. 3 shows a block diagram for processing the outputs from the first and second photo-detectors 51 and 52 into the coded position signal. The first outputs F-0 to F-7 from the first photo-detectors 51-0 to 51-7 as well as the second outputs S-0 to S-7 from the second photo-detectors 52-0 to 52-7 are amplified at individual amplifiers AMP and are then fed to individual sections 61 and 62 where each of the first and second outputs is processed to detect the spot S in each of the first and second arrays 31 and 32 receiving a maximum light energy, and to transmit first and second position signals each representing a particular numeral of the element responsible for the maximum light energy for each of the first and second arrays 31 and 32. The first and second position signals thus obtained with respect to the first and second arrays 31 and 32 are then fed to a beam spot judging section 70 where they are processed to provide the above-mentioned two digit position signal in the coded form comprising the numerals of the elements in the first and second arrays detected respectively to be responsible for the maximum light energy received.

Figure 4:
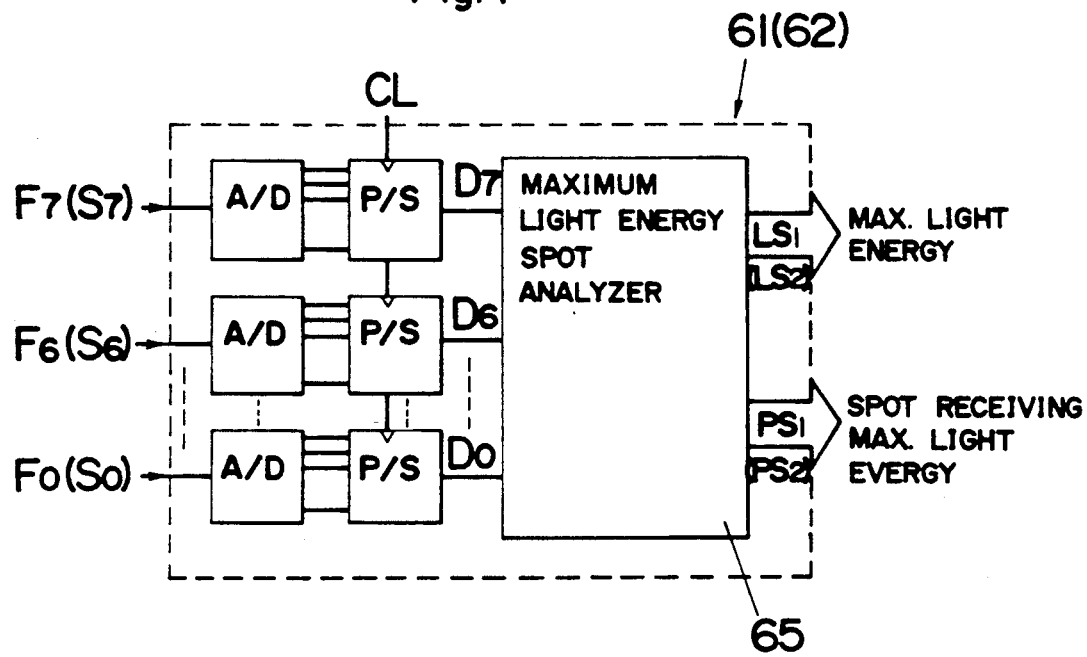
FIG. 4 is a schematic block diagram of scan spot detecting circuit utilized in the above system.

In detail, each of the sections 61 and 62 for detection of the beam spot in the first and second arrays comprises, as shown in FIG. 4, analog-to-digital converters which convert the outputs F0 to F7 (S0 to S7) from the corresponding photo-detectors into parallel fed digital data. The digital data are then converted through parallel-serial converters P/S into serial digital data $D_0$ to $D_7$ which are fed to a maximum light energy spot analyzer 65 where they are analyzed to find a maximum light energy received at one group of the elements having the same numeral and to identify such group of the elements responsible for the maximum light energy. The individual analyzers 65 for the first and second arrays 31 and 32 generate the above-mentioned first and second position signals $PS_1$ and $PS_2$ respectively indicating the numerals of the groups of the elements receiving the maximum light energy in the first and second arrays. Additionally, the individual analyzers 65 transmit first and second level signals $LS_1$ and $LS_2$, respectively indicating the maximum light energy received in the first and second arrays, which level signals may be utilized at the beam spot judging section 70 for verification of the system operation. Although not illustrated, the analyzer 65 is designed to comprise logical circuit elements in order to effect the above operation of obtaining the position and level signals at a considerably high processing rate.

Figure 5A:
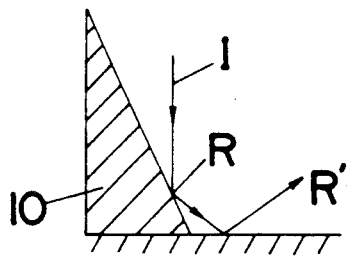
FIGS. 5A, 5B, 6A, 6B, and 7 are respectively explanatory views illustrating differing conditions which may cause erroneous measurement.
Figure 6A:
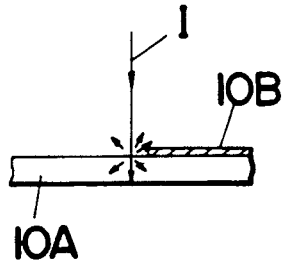
Figure 5B:
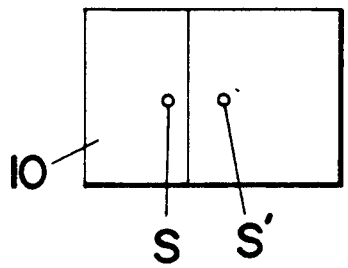
Figure 6B:
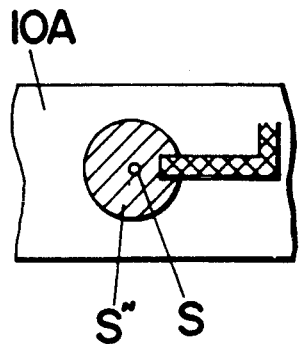
Figure 7:
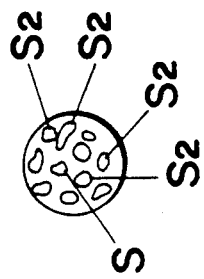

It should be noted in this connection that the above detection of the beam spot on the arrays by examining the maximum light energy is advantageous in excluding erroneous information and therefore detecting an exact beam spot on the arrays. Such erroneous information may result from secondary reflections other than at the object surface or other scattering reflections of less energy level occurring around the scanned point on the object surface. For instance, as shown in FIGS. 5A and 5B, when a light beam I is directed to a steeply inclined surface of an object 10, a secondary reflection R' may occur other than at the object surface to cause a false spot S' adjacent to a true spot S resulting from the light beam R reflected at the object surface. Also, as shown in FIGS. 6A and 6B, when the light beam I is directed to a circuit board composed of a transparent substrate 10A and an opaque circuit pattern 10B to scan a region adjacent the edge of the circuit pattern 10B, the light beam is scattered in the substrate 10A causing an enlarged obscure spot S'' to be formed around a true beam spot S to be monitored. Although these secondary and scattered reflections might cause a confused pattern of beam spots on the arrays of the position detector, they are of less intensity level and therefore can be excluded for determination of a true beam spot receiving the light beam from the object surface. Further, as seen in FIG. 7, when a number of spurious spots $S_2$ are formed around an intended spot S resulting in a speckle pattern, the intended spot S can be well distinguished from the spurious spots $S_2$ of less intensity level with the above scheme of detecting the beam spot on the array by examining the maximum light energy received at the elements.

The position signal obtained at the beam spot judging section 70 is continuously fed to a profile determining section 80 where it is processed to measure individual distances to the scanned points on the object surface by triangulation and to obtain from thus measured distances height data of the scanned points from the reference plane which is generally perpendicular to the plane including the axes of the light beams directed to and reflected from the object surface. Thus obtained height data is then processed in association with a suitable scale of the scanned points in the reference plane to finally determine a profile of the object surface.

Figure 8:
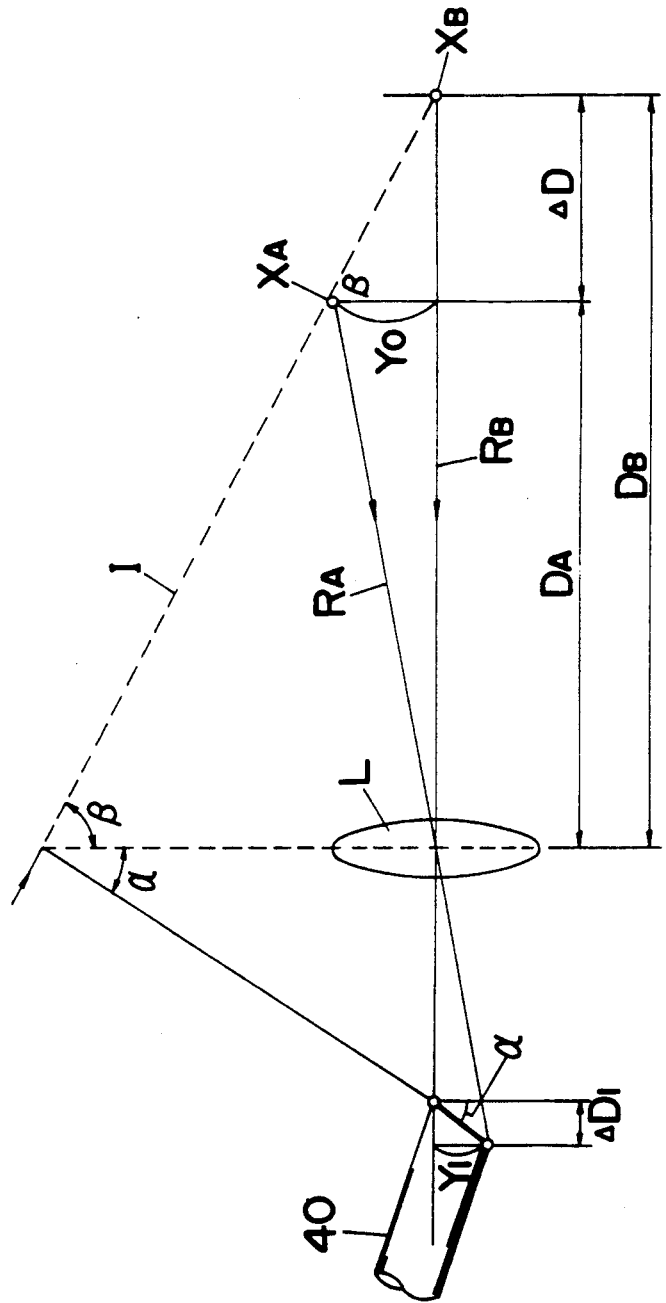
FIG. 8 is a diagram illustrating the Scheimpflug condition to be satisfied in an optical arrangement of the above system.
Figure 9:
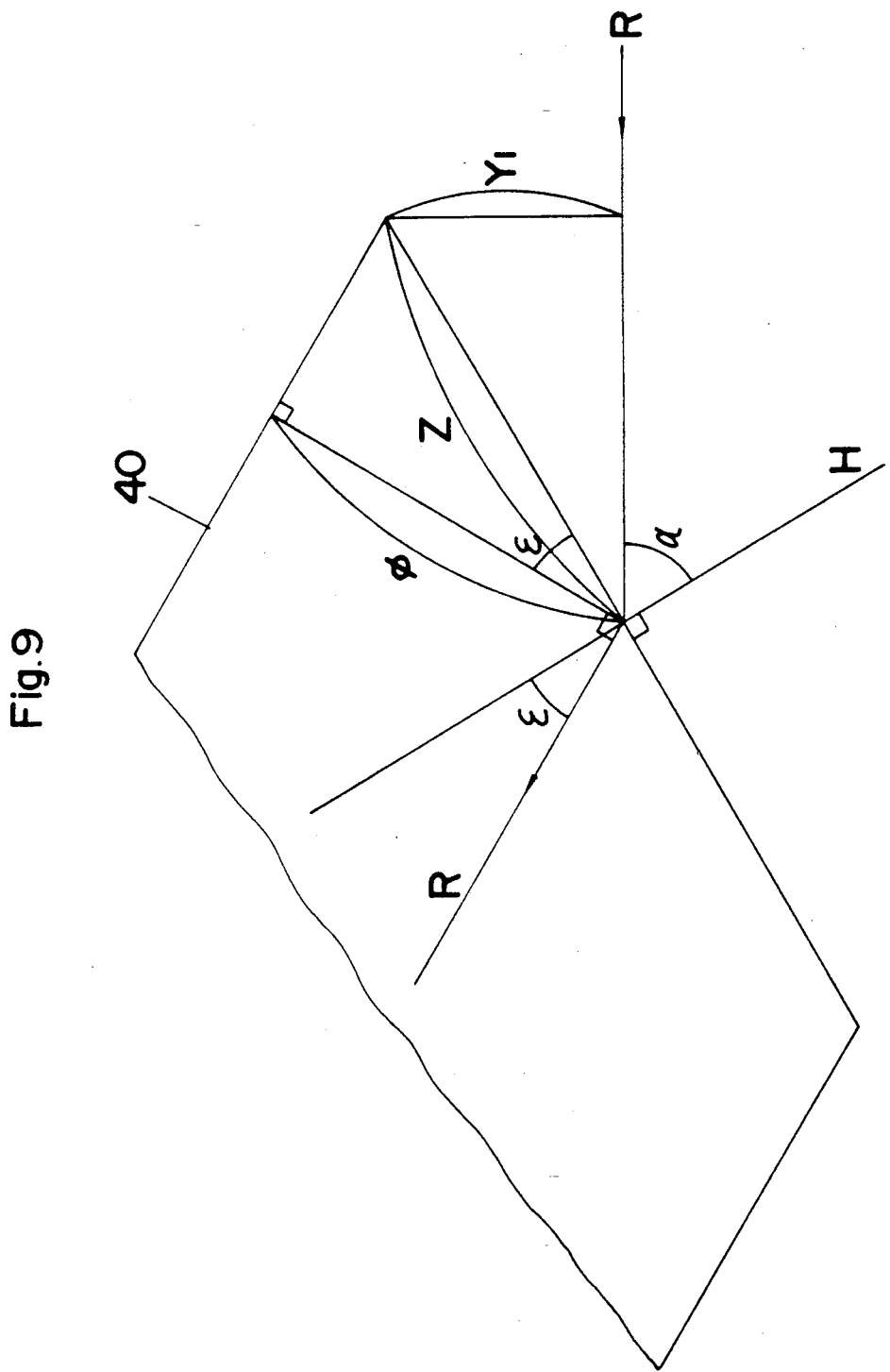
FIG. 9 is a diagram illustrating an optical configuration of a slanted light receiving end face of an optical-fiber forming the above position detector.

In the meanwhile, the one end face of each optical-fibers 40 defining the light receiving element is tilted at such an angle $\alpha$ to satisfy the Scheimpflug condition for lens L and object plane, as shown in FIG. 8, in which $R_A$ and $R_B$ are the reflected light beam from points $X_A$ and $X_B$ on the object surface spaced from the lens L respectively by distances of $D_A$ and $D_B$, $\alpha$ and $\beta$ are respectively angles of the light receiving plane of the optical-fiber and the light beam I relative to a plane of the lens L, and $\Delta D$ is a range of measurable distances determined by a corresponding depth $\Delta D_1$ of the light receiving plane. Further, in the optical system of the present invention, the fiber optics is so designed as to direct the reflected light beam through the optical fiber 40 in parallel with the axis thereof. To satisfy this requirement and at the same time the Scheimpflug condition, the light receiving face of the optical-fiber 40 is cut at an angle $\epsilon$ relative to a plane normal to the axis of the optical-fiber 40, as seen in FIG. 9. The angle $\epsilon$ is dependent upon an index of refraction n of the optical-fiber and is determined to satisfy the following equations:

$$\tan \alpha = M \tan \beta \quad (1)$$

$$\cos \epsilon = \phi / Z \quad (2)$$

$$\sin \alpha / \sin \epsilon = n \quad (3)$$

where M is a magnification of the lens, $\phi$ is a diameter of the optical-fiber, Z is a diameter of the inclined end face of optical-fiber.

From FIG. 9, it is obtained that;

$$\sin (\pi/2 - \alpha) = \cos \alpha = Y_1/Z \quad (4)$$

Figure 10:
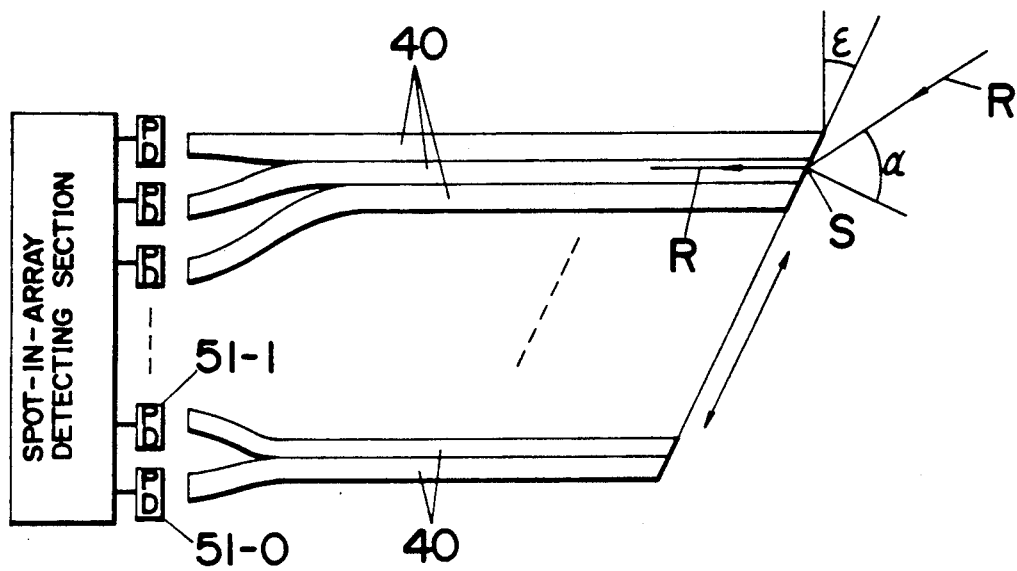
FIG. 10 is a schematic view illustrating the bundles of the optical-fibers coupled to corresponding photo-detectors to form the above position detector.

And form FIG. 8, it is obtained that;

$$Y_1 = M \times Y_0 \quad (5)$$

$$Y_0 = A \cos \beta \quad (6)$$

where A is a resolution required for the optical-fiber. For given $\beta$, $\phi$, and A, combining the above equations (1) to (6) gives the values M, $\alpha$, and $\epsilon$ as follows:

$$M = \sqrt{\frac{-b + \sqrt{b^2 + 4ac}}{2a}}$$

$$\alpha = \arctan (M \times \tan \beta)$$

$$\epsilon = \arcsin (\sin \alpha/n)$$

where
 $a = (n^2 - 1)A^2 \sin^2 \beta$
 $b = n^2 A^2 \cos^2 \beta$
 $c = n^2 \phi^2$ In this manner, the optical-fiber can be designed to have values M, $\alpha$, and $\epsilon$. In this connection, it is noted that the optical-fiber can have a compressed resolution of $Y_1$ (MAcos $\beta$) which is less than $\phi$. The optical-fibers, each having the light receiving end face slanted at an angle ε relative to a plane normal to the axis of the optical fiber, are arranged, as schematically shown in FIG. 10, to have the slanted end face tilted at an angle of α so as to satisfy the Scheimpflug condition and at the same time to direct the light beam R incident to the slanted end face through each optical-fiber in parallel with the axis thereof toward the corresponding photo-detector PD, thereby enabling to detect a sharp image of the object with improved optical characteristics.

Figure 11:
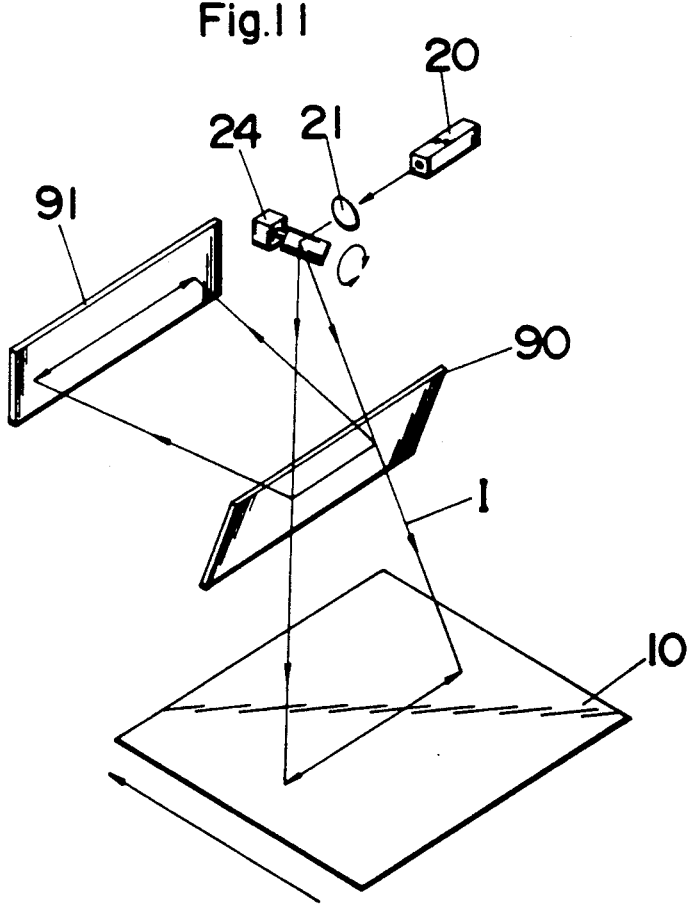
FIG. 11 is a schematic view illustrating a beam splitter and a scan point tracing sensor utilized in the above system.
Figure 14:
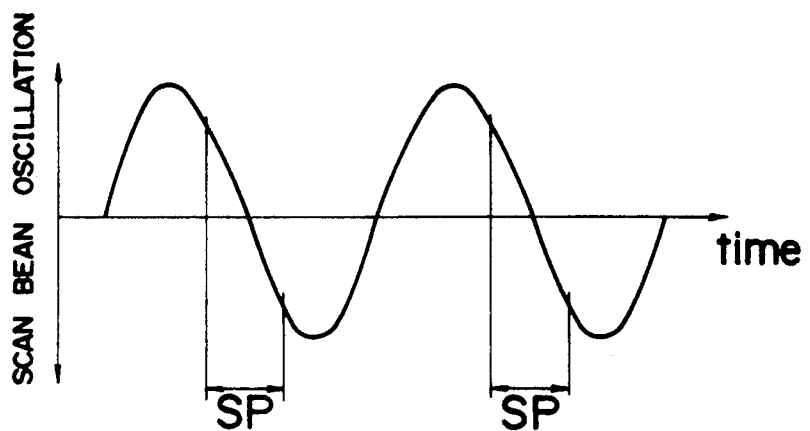
FIG. 14 is a waveform chart illustrating an effective scan period defined in the above system for measurement of the object surface.

As shown in FIG. 11, the optical system further includes a beam splitter 90 which is positioned between the first oscillating mirror 24 and the object 10 to reflect part of the oscillating light beam I directed toward the object 10. The split part of the light beam is constantly monitored by a scan point tracing sensor 91 which provides a timing signal indicating an instantaneous horizontal position or horizontal scale of the scanned points on the objects surface. It is this timing signal that is fed to the profile determining section 80 [FIG. 3] to be cooperative with the above mentioned height data, which is obtained thereat based upon the position signal fed from the beam spot judging section 70 in the form of the coded signal, for determination of the object profile. That is, the timing signal is associated with the height data measured with regard to the individual scanned points so as to distribute or calibrate the height data along the horizontal scale, thereby determining a contour or profile of the object surface along the scanned points within a plane non-parallel to the reference plane. The scan point tracing sensor 91 comprises, as shown in FIG. 12, a plurality of photo-detectors 92 arranged in a comb-teeth fashion and a pair of end photo-detectors 93 and 94 at the opposite ends of the comb-teeth configuration. The photo-detectors 92 forming the comb-teeth configuration are spaced evenly to detect the instantaneous position of the oscillating light beam and output the timing signal, as shown in FIG. 13B, while the end photo-detectors 93 and 94 are positioned to detect the ends of the oscillation amplitude of the light beam and provide reference outputs, respectively as shown in FIGS. 13A and 13C. Thus configured position detector 91 is spaced from the beam splitter 90 by an optical distance equal to that measured from the beam splitter 90 to the object 10 such that the reflected light beam will have a beam spot of minimum diameter on the array of the photo-detectors. In this sense, the scan point tracing sensor 91 is disposed downstream of the first focusing lens 25, although not seen in FIG. 1 and 11. The outputs from the end photo-detectors 93 and 94 are utilized to define an effective scan period SP within each one cycle of the light beam oscillation, as shown in FIG. 14, in which effective scan period SP the position detector 30 is operative to provide the position signal. In the figure, the effective scan period SP is illustrated as being defined in the forward path of the light beam oscillation based upon the output from the photo-detector 93. But, it is equally possible to define the effective scan period in the return path of the light beam oscillation based upon the output from the photo-detector 94.

Figure 15:
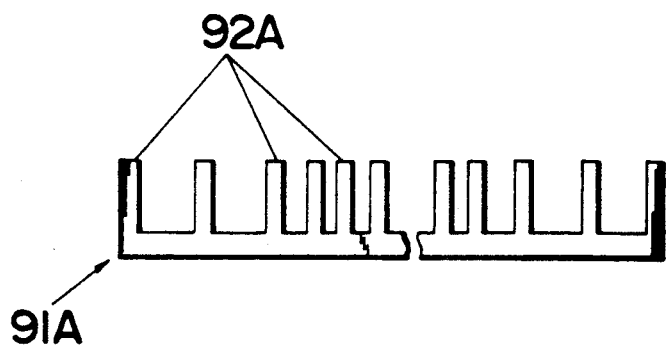
FIG. 15 is a schematic view illustrating an array of photo-detectors forming another scan point tracing sensor.

FIG. 15 shows another preferred arrangement of a scan point tracing sensor 91A in which a number of photo-detectors 92A are spaced by a closer interval toward the center than at the opposite ends in conformity with the varying oscillation velocity of the light beam. With this arrangement, it is possible to accurately detect the horizontal position of the oscillating light beam with reduced number of the photo-detectors employed.

Figure 16:
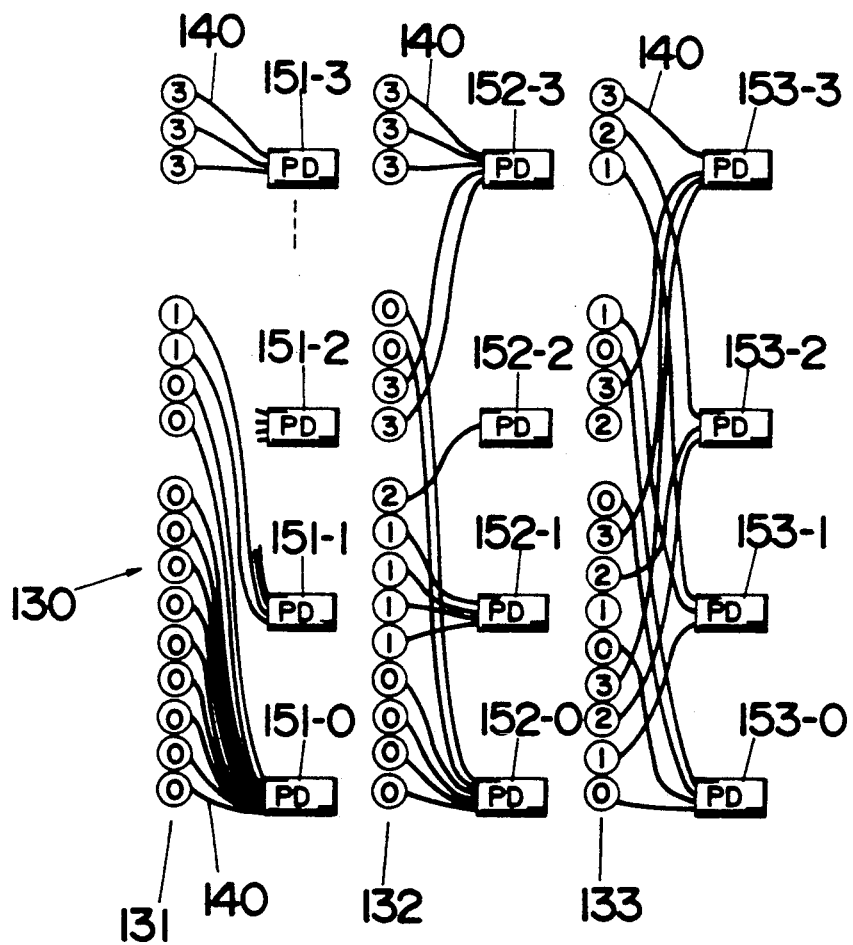
FIG. 16 is a schematic view illustrating a position detector with a modified array arrangement which may be utilized in the present invention.

Although the position detector 30 in the above embodiment is configured, as shown in FIG. 2, to comprise two arrays of the light receiving elements, it may include more arrays as illustrated in FIG. 16, for example. In a modified position detector 130 of FIG. 16, the light receiving elements are arranged in three arrays, i.e., first, second and third arrays 130A, 130B, and 130C. The first and second arrays 130A and 130B are likewise divided into subdivisions including an equal number of the elements which are designated by the same numerals within the same subdivisions but are designated by different numerals with differing subdivision. On the other hand, the third arrays 130C are divided into subdivisions each having the equal number of the elements which are designated by different numerals within each subdivision but are designated by the common numerals over the differing subdivisions. The elements designated by the same numerals, in each of the first, second and third arrays 130A, 130B, and 130C, are commonly coupled to the photo-detectors 151-0 to 151-3, 152-0 to 152-3, and 153-0 to 153-3 through individual optical-fibers 140 in the like manner as in the first embodiment. Consequently, a particular location of the light beam focusing on the arrays of the position detector 130 can be identified as a three-digit signal composed of three numerals each corresponding to the element receiving the light beam in each of the first, second, and third arrays. For instance, the signal "032" is issued from the position detector 130 when the light beam is detected to straddle over the elements designated by numerals "0", "3", and "2" in the first, second, and the third arrays, respectively. The series of the signals thus obtained during the scanning operation are processed in the like manner to provide height data of the individual scanned points on the object surface for determination of an object profile.

Second embodiment

Figure 17:
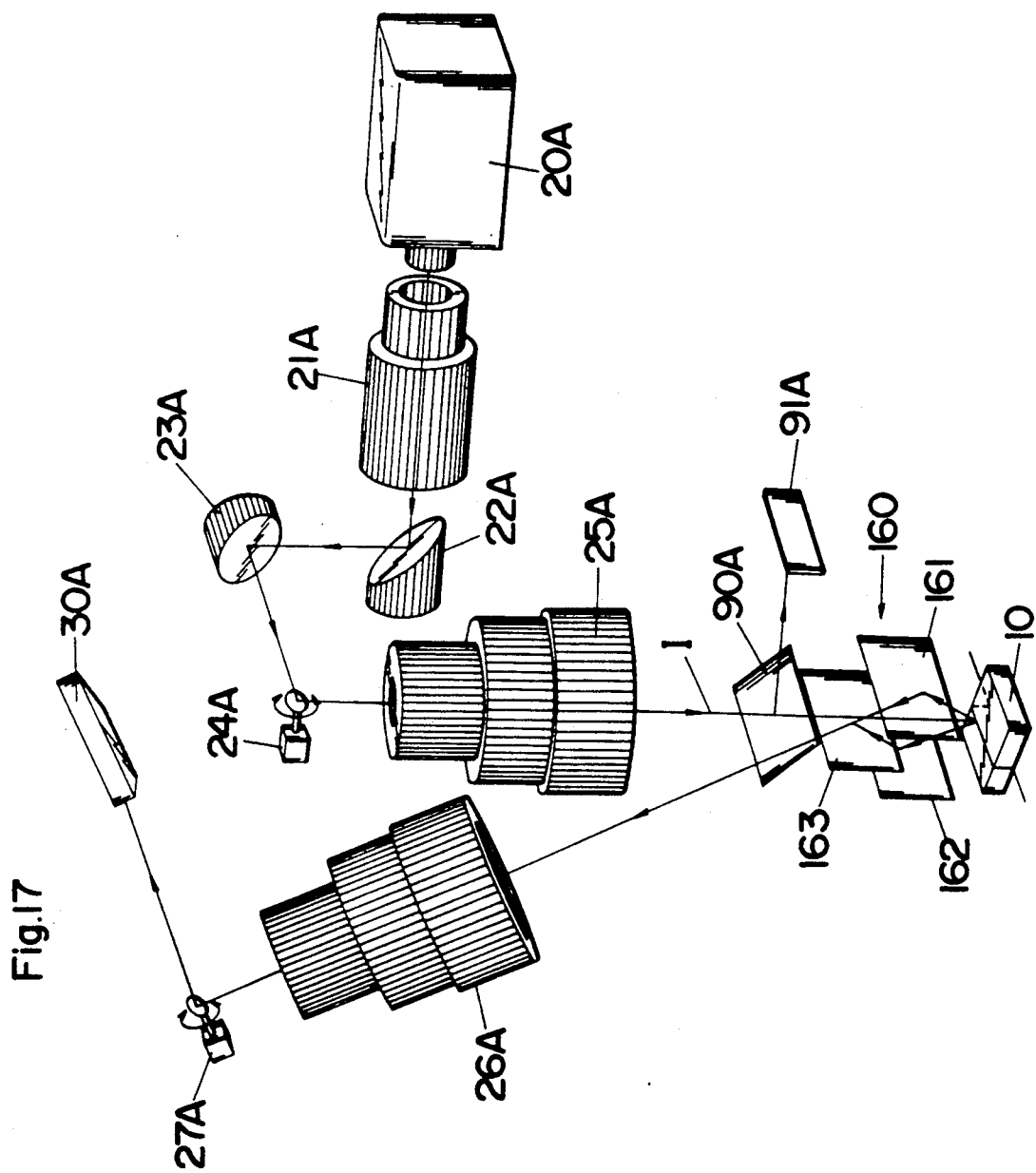
FIG. 17 is a schematic view illustrating an optical measurement system in accordance with a second embodiment of the present invention.
Figure 18:
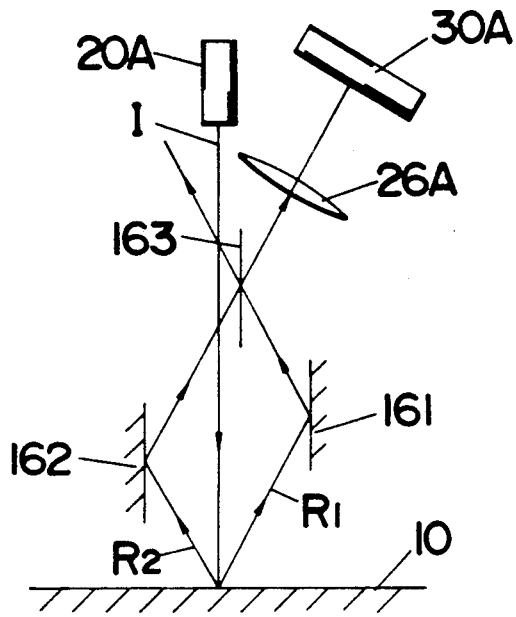
FIG. 18 is a diagram illustrating the operation of the system of FIG. 17.

Referring to FIG. 17, there is shown an optical measurement system in accordance with a second embodiment of the present invention which is identical to the first embodiment except that it additionally includes mirror assembly 160. The like parts are designated by the like numerals with a suffix letter of "A" for an easy reference purpose. The mirror assembly 160 comprises a pair of plane mirrors 161 and 162 symmetrically disposed on the opposite side of the axis of the light beam I incident to the object 10, and a beam splitter 163, as schematically shown in FIG. 18. The beam splitter 163 is positioned to receive two opposite mirror images of the object 10 reflected from the respective mirrors 161 and 162 such that one of the images is reversed and overlaid on the other image to form a composite image. The composite image thus obtained is directed to the position detector 30A for determination of an object profile. With this provision of the mirror assembly 160, it is possible to obtain a correct image of the object surface even if an obstacle is present adjacent the object surface to interrupt one of the images, or one of the reflected light beams R1 and R2 from the object 10 to one of the mirrors 161 and 162.

Figure 19:
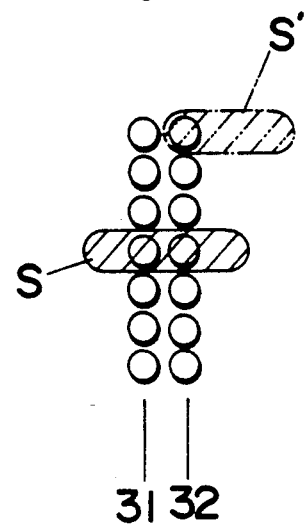
FIG. 19 is an explanatory view showing a problem to be solved in the optical system of the present invention.
Figure 20:
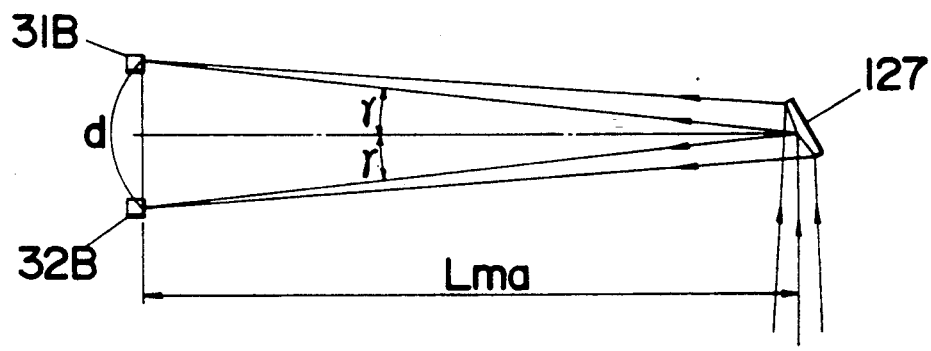
FIG. 20 is a diagram illustrating a modified optical arrangement which may be utilized in the present invention.
Figure 21:
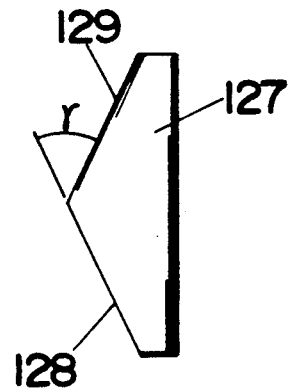
FIG. 21 is a view of an oscillating mirror forming the above modification optical arrangement of FIG. 20.

In the meanwhile, if the first and second oscillating mirrors 24 (24A) and 27 (27A) are not properly synchronized with one another, it is possible that, as shown in FIG. 19, the beam spot S' formed on the first and second arrays 31 and 32 of the position detector shifts in the direction perpendicular to the oscillating direction of the light beam from an intended location S to such an extent as to fail to straddle over the arrays 31 and 32. To avoid this occurrence, it is preferred to have separate arrays 31B and 32B spaced at a suitable distance d, as shown in FIG. 20, and to focus the reflected light beam on each of the arrays 31B and 32B with a suitably expanded width of the beam spot. For this purpose, a second oscillating mirror 127 of unique configuration is utilized to diverge the reflected light beam into separate light beams which are respectively directed to the separate arrays 31B and 32B. The second oscillating mirror 127 is designed to have separate mirror surfaces 128 and 129 which are angularly displaced by an angle of γ, as shown in FIG. 21. The angle γ depends upon the distance d between the separated arrays 31B and 32B and the distance Lma (as shown in FIG. 20) between the center of the arrays and the mirror 127, and is determined by the following equation:

$$\gamma = \arctan(d/2Lma).$$

Figure 22:
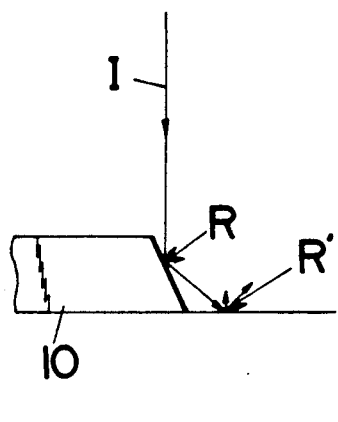
FIG. 22 is an explanatory view illustrating a condition which may cause erroneous reflections detected by the position detector.
Figure 23:
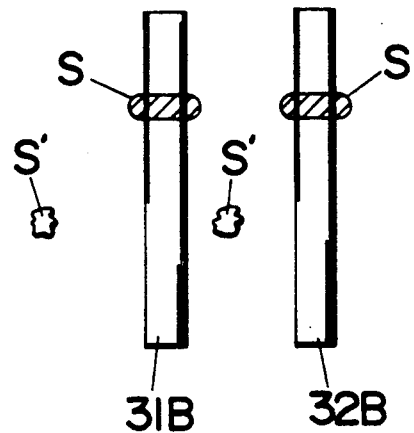
FIG. 23 is a diagram illustrating spaced arrays resulting from the optical arrangement of FIG. 20.
Figure 24:
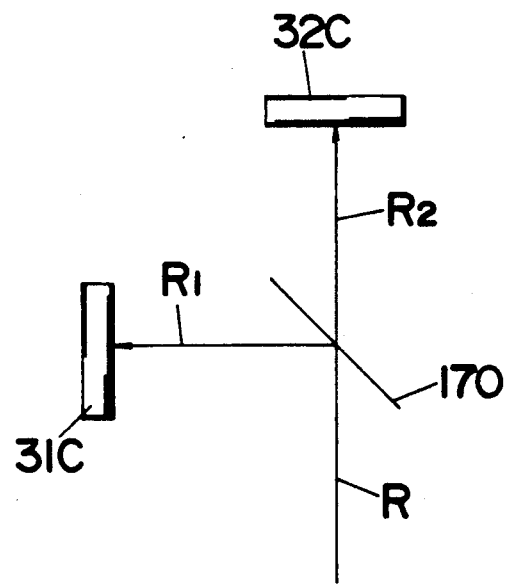
FIG. 24 is a diagram illustrating an alternate optical arrangement of FIG. 20.

As apparent from the above, when the mirror 127 is designed to have a greater value for γ, then the distance d between the arrays can be correspondingly made greater. With this arrangement, each of the divergent separate light beams can be focused on each of the arrays with increased tolerance against the shifting of the light beam. It should be noted in this connection that the above scheme of separately focusing the divergent light beams on the separate arrays is advantageous also in eliminating erroneous reflections from entering the arrays. For instance, as shown in FIG. 22, such erroneous reflections may be a secondary reflection R' which occurs at a point other than at the object surface and is directed to form a beam false spot S' adjacent to a true beam spot S resulting from a reflected light beam R at the object surface, as shown in FIG. 23. As apparent from the figure, it is possible to prevent such false beam spots S' from forming on the arrays and to form only the intended beam spots S respectively on the suitably spaced arrays 31B and 32B, giving rise to accurate measurement of the object surface substantially free from the erroneous reflections. Instead of using the second oscillating mirror 127 having differently oriented mirror surfaces 128 and 129, it is also possible to use a beam splitter 170 for diverging the reflected light beam R from the object surface into separate light beams $R_1$ and $R_2$ directed to separately disposed arrays 31C and 32C, as shown in FIG. 24.

Third embodiment

Figure 25:
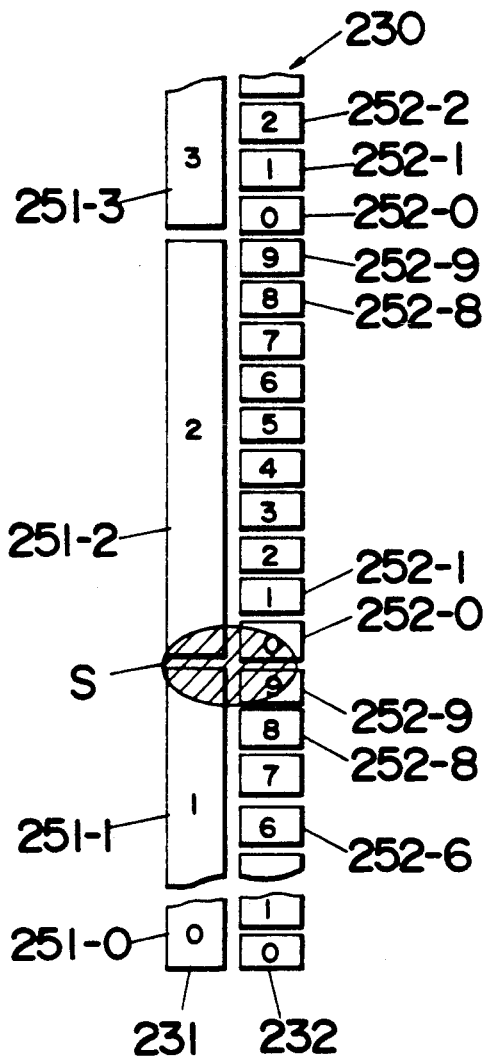
FIG. 25 is a schematic view illustrating an array arrangement of a position detector utilized in an optical system in accordance with a third embodiment of the present invention.

FIG. 25 illustrates a position detector 230 utilized in a third embodiment of the present invention. The configurations of the system other than the detector 230 is identical to those in the above first embodiment. The position detector 230 comprises a number of photodetectors which are arranged in two arrays 231 and 232 over which the light beam from the object surface is focused. Each of the photo-detectors 251-0 to 251-n forming the first array 231 has a light sensitive element or surface elongated in the direction of following the oscillating light beam reflected from the object surface. While on the other hand, each of the photo-detectors 252-0 to 252-9 forming the second array 232 has a minute light sensitive element or surface of a dimension of about one-tenth of that of the photo-detector forming the first array 231. That is, the light sensitive element of each photo-detector in the first array 231 extends a range covering ten (10) discrete light sensitive element of the photo-detectors forming the second array 232. As shown in the figure, the photo-detectors forming the first array 231 are designated by numerals "0" to "n", while those forming the second array 232 are designated by numerals "0" to "9" in a repeated order so that the second array 232 is divided into subdivisions each composed of ten photo-detectors designated by numerals "0" to "9".

The photo-detectors forming the first array 231 are each provide a single output indicating which one of the detectors receives a maximum light energy. In the second array 232, all of the photo-detectors designated by the same numeral are collectively coupled to provide a single output which does not locate a particular subdivision but only locate which one of the photo-detectors within the subdivision is responsible for receiving a maximum light energy. The outputs from the photo-detectors of the first and second arrays are processed at a like beam spot judging section in the like manner as in the first embodiment to provide a coded or two-digit position signal comprising the numerals each denoting each one of the photo-detectors in the first and second arrays detected to receive the maximum light energy. The coded position signal thus obtained is subsequently processed in the like manner as in the first embodiment to determine an object profile.

Figure 26A:
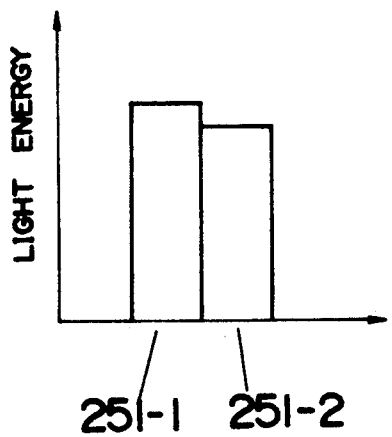
FIGS. 26A and 26B are views respectively illustrating the operations of the above position detector of FIG. 25.
Figure 26B:
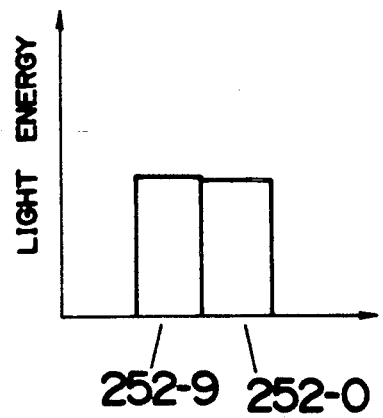

To provide the coded position signal which is reliably indicative of an exact beam spot S on the arrays when the beam spot S comes around the boundary between the adjacent photo-detectors of the first array 231, as indicated in FIG. 25, the present embodiment is contemplated to interpret which one of the adjacent photo-detectors in the first array 231 has its output combined with the output of the photo-detector in the second array 232 in order to provide the coded signal. For instance, when the beam spot S is just moving across the boundary between the photo-detectors 251-1 and 251-2 in the first array 231, as seen in the figure, it occurs that the adjacent photo-detectors 251-1 and 251-2 in the first array 231 detect respectively the light energy of approximately the same level, as shown in FIG. 26A. That is, at one moment during the movement of the beam spot S one of the adjacent photo-detectors 251-1 and 251-2 sees a maximum light energy and soon thereafter the other photo-detector will see a maximum light energy. At the same time, the beam spot S extends over the adjacent photo-detectors 252-9 and 252-0 in the second array such that one of the photo-detectors 252-0 and 252-9 sees a maximum light energy level, as seen in FIG. 26B. At this occurrence, it is possible that the outputs of the photo-detectors in the first and second array are erroneously combined to provide a false signal in the coded form of "10" or "29", although the actual location of the beam spot S should be presented in the coded form of "19" or "20". In order to eliminate such false signal, a step is included in the beam spot judging section to verify the numeral of the first array depending upon the numeral of the photo-detector in the second array detected to receive the maximum light energy. That is, when the photo-detector in the second array detected to receive the maximum light energy is identified by its numeral which is greater than half of a maximum numerical value of the numerals employed to designate the photo-detectors in the second array, then it is selected a lower one of the two numerals designating the adjacent photo-detectors in the first array, and otherwise it is selected the greater numeral to be combined with the numeral designating the photo-detector in the second array to provide the coded position signal. In the illustrated instance, therefore, when any one of "0" to "4" is issued as indicating the beam spot in the second array, a lower numeral, i.e., "2" is then selected as a valid numeral designating the photo-detector in the first array. And when "5" to "9" is issued as indicating the beam spot in the second array, then a greater numeral, i.e., "1" is selected. The selected numeral of the first array is then combined with the one of numerals "0" to "9" of the second array so as to produce the coded signal identifying the actual beam spot in the arrays.

Figure 27:
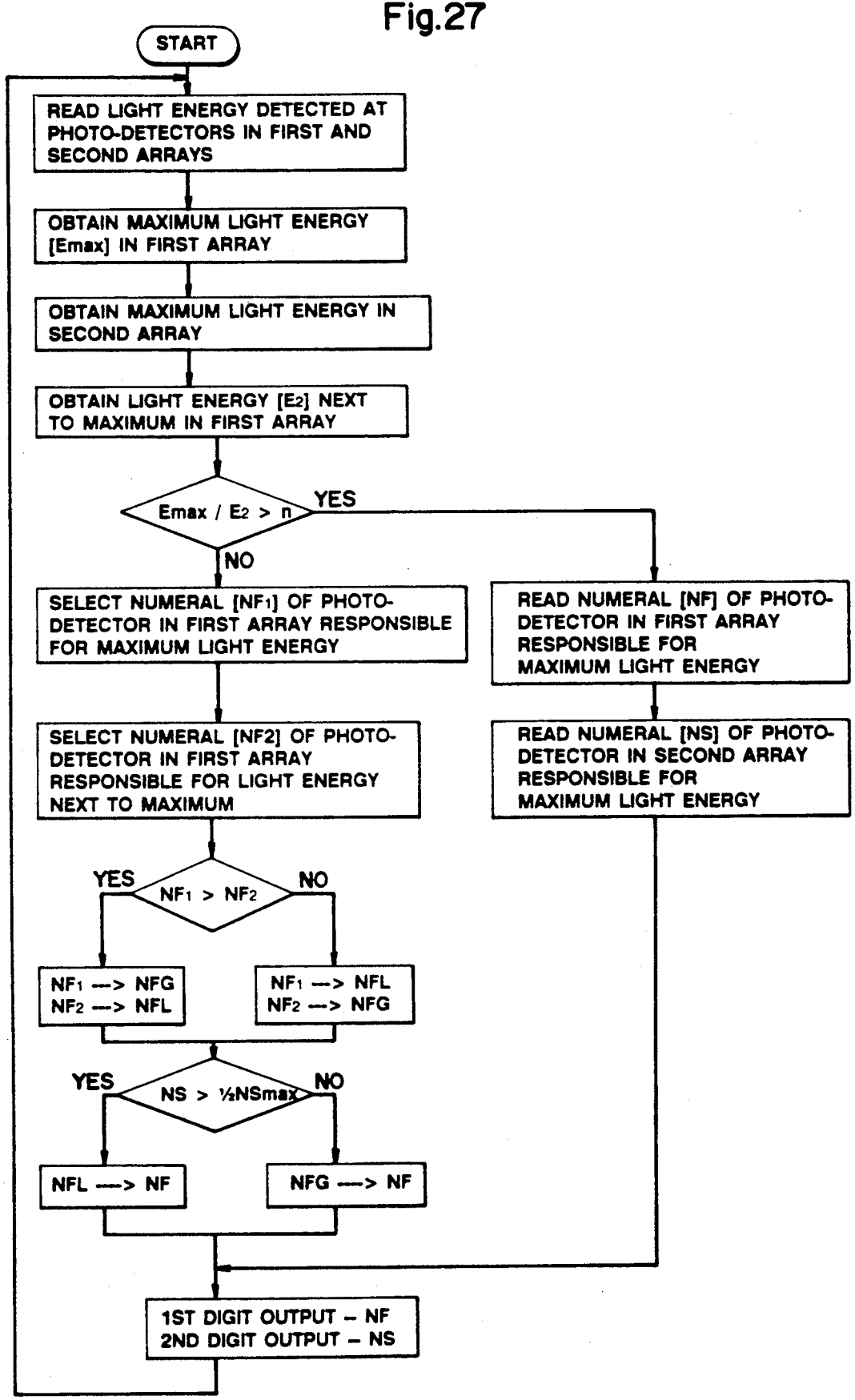
FIG. 27 is a flow chart illustrating an operation of the third embodiment.

The above operation is illustrated in a flow chart of FIG. 27. Firstly, the light energy received by the photo-detectors in the first and second arrays are respectively read in order to obtain a maximum light energy detected in each of the first and second arrays, and to obtain a light energy $E_2$ next to the maximum light energy Emax in the first array. Then, a ratio Emax/$E_2$ of the maximum light energy Emax to the next greater light energy $E_2$ is compared with a constant n so as to determine whether the two energy levels are close enough to indicate that the beam spot is around the boundary of the adjacent photo-detectors in the first array. When the ratio is found greater than n, it is judged that the spot beam is within the particular photo-detector in the first array and a sequence proceeds to decide the numeral NF designating the particular photo-detector in the first array as well as the numeral NS designating the photo-detector detected to receive the maximum light energy in the second array. The numerals NF and NS thus decided are combined to provide the coded position signal having the first digit of NF and the second digit of NS. When, on the other hand, the ratio Emax/$E_2$ is found less than n, it is judged that the beam spot extends over the boundary between the adjacent photo-detectors in the first array and a sequence proceed to select the numerals $NF_1$ and $NF_2$ respectively as designating the adjacent photo-detectors in the first array respectively responsible for the maximum light energy and the light energy next thereto. Then, the selected numerals $NF_1$ and $NF_2$ are compared in its numerical value in order to find which is greater or not. When $NF_1$ is found greater than $NF_2$, then $NF_1$ is identified as a greater value NFG and $NF_2$ as a less value NFL. Otherwise, $NF_1$ and $NF_2$ are identified in a reverse order as NFL and NFG, respectively. Thereafter, the numeral NS designating the photo-detector in the second array responsible for the maximum light energy is compared as to whether it is greater than half of a maximum value NSmax of the numerals, i.e., "0" to "9" in the illustrated embodiment, utilized to designate the photo-detectors in the second array. When NS is found to be greater than ½NSmax, the lower value NFL is selected as forming a first digit NF indicative of the beam spot in the first array. Otherwise, the greater value NFG is selected as forming a first digit NF indicating of the beam spot in the first array. The selected numeral NF for the first array is then combined with the numeral NS forming the second digit to provide the two-digit coded position signal composed of NF and NS. The above operation is repeated during the effective scan period for obtaining a series of the above-mentioned height data with respect to the individual scanned points on the object surface.

Figure 28:
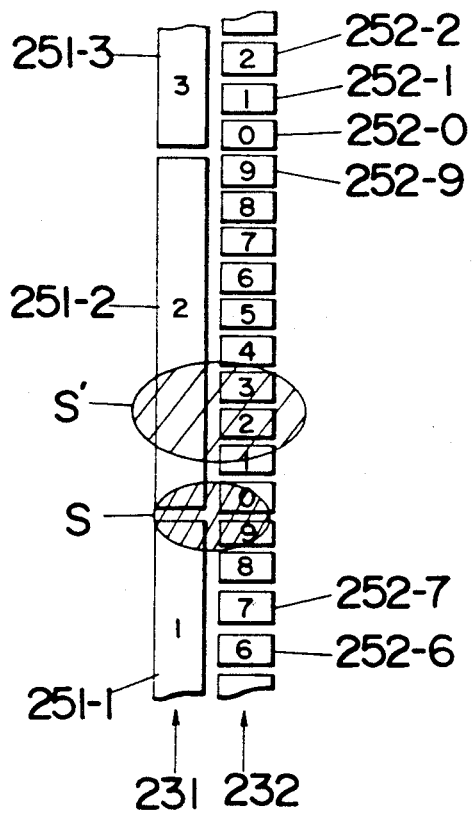
FIG. 28 is a schematic view explaining the operation of the array arrangement of FIG. 25.

The above scheme is found particularly advantageous and useful in excluding a false beam spot which may be received on the arrays and result from erroneous reflections including secondary reflections other than at the object surface. For instance, as shown in FIG. 28, when the arrays see a true beam spot S around the boundary between the adjacent photo-detectors in the first array 231 and a false beam spot S' resulting from the erroneous reflections in the vicinity of the true beam spot S, the second array 232 can provide a reliable output identifying a correct numeral, in this instance, "0" or "9" since the true spot S shows a light energy considerably greater than the false spot S'. In this case, however, even light energy of less intensity from the false spot S' will add to the light energy from the true spot S such that a particular photo-detector (i.e., the one designated by 252-2, in the illustrated instance) will be detected to receive a maximum light energy although it was not. When this occur, a false coded position signal "29" would result, "2" for the photo-detector of the first array and "9" for that of the second array. Nevertheless, such a false position signal can be excluded with the above spot interpretation scheme but valid position signal "19" or "20" will be issued as indicating the true beam spot S on the array. In this sense, the system of the present embodiment can reliably discriminate the true beam spot without being confused by the false beam spot resulting from the erroneous reflections. It should be noted at this time that the above interpretation scheme can be equally included in the first embodiment for obtaining the height data of the individual scanned points in a reliable manner.

Figure 29:
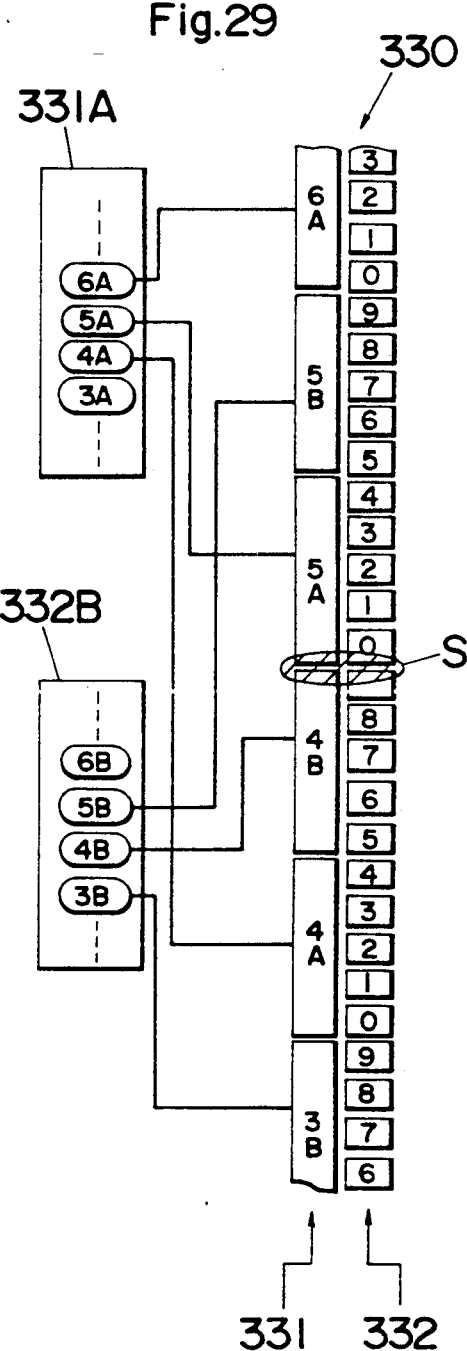
FIG. 29 is a schematic view illustrating an array arrangement of a position detector in accordance with a modification of the third embodiment.

FIG. 29 illustrate a modified array arrangement of a position detector 330 which may be utilized in the present invention. The modified position detector 330 is similar to the above third embodiment except that a first array 331 comprises a number of photo-detectors each having an extended light sensitive element covering five (5) discrete light sensing elements of the photo-detectors forming a second array 332. The photo-detectors in the first array 331 are designated by numeral plus letter, i.e., "3B", "4A", "4B", "5A", "5B", "6A", and so forth, while the photo-detectors forming the second array 332 are designated by numerals, "0" to "9". As seen in the figure, the photo-detectors of the second array 332 are arranged in such an order that the photo-detectors designated by numerals "0" to "4" in the second array 332 correspond to those of the first array 331 having the suffix letter of "A" and the photo-detectors designated by numerals "5" to "9" in the second array 332 correspond to those of the first array 331 having the suffix letter of "B". Every other photo-detectors of the first array having the suffix letter of "A" and "B" are grouped to form two high and low output groups 331A and 331B such that when any one of numerals "0" to "4" is issued from the second array 332 as indicating the location of the beam spot S in the second array 332, the low output group 331B is selected to find which one of the photo-detector within this group receives a significant light energy. On the other hand, when any one of numerals "5" to "9" is issued from the second array 332, then the high output group 331A is selected to find which one of the photo-detectors in that group received a significant light energy. For example, as seen in the figure, when the spot beam S comes around the boundary between the adjacent photo-detectors of the first array 331 designated by numerals "4B" and "5A" and also the boundary between the adjacent photo-detectors in the second array 332 designated by numerals "9" and "0", only one of the output groups 331A and 331B is selected to provide the output "4" from the photo-detector "4B" in the low output group 331B (when numeral "9" is output from the second array as indicating the location of the beam spot S in the second array 332), or the output "5" from the photo-detector "5A" in the high output group 331A (when numeral "0" is output from the second array 332 as indicating the location of the beam spot S). The output of the first array thus decided is combined with the output of the second array to form a coded signal "49" or "50". In this manner, depending upon the value of the numeral for the photo-detector in the second array receiving the maximum light energy, the system will refer to only one of the output groups 331A and 331B to find the numeral of the photo-detector showing the significant light energy and to combine thus found numerals for the first and second arrays in order to provide the coded position signal indicating an exact location of the beam spot S in the arrays. Consequently, there is no need to compare the energy level of the adjacent photo-detectors in the first array, which contribute to reducing the number of processing steps in obtaining the position signal.

FIG. 30 illustrates a still another array arrangement of a modification position detector 430 which is characterized to have three arrays of photo-detectors. In this modification, an extra first array 431X is added to an like array arrangement of the third embodiment composed of first and second arrays 431 and 432. The first array 431 comprises a plurality of photo-detectors each having an elongated light sensitive element which corresponds to ten (10) discrete light sensitive elements of the photo-detector forming the second array 432, the photo-detectors in the first array 431 being designated by numerals, i.e., "3", "4", "5". The extra first array 431X comprises an equal number of photo-detectors each having a light sensitive element of the same dimension as that of the photo-detector of the first array 431, the photo-detectors of the extra first array 431X being designated by numeral plus letter combinations, i.e., "2A", "3A", "4A", and so forth. The photo-detectors of the extra first array 431X are staggered with respect to those in the first array 431 such that a definite number of the photo-detectors of the second array 432 are positioned exactly within the length of one of the photo-detectors forming the first and extra first arrays 431 and 431X. In the illustrated arrangement, each continuous set of the photo-detectors of the second array 432 designated by numerals "0" to "4" are positioned exactly within the length of each photo-detector of the first array 431, while each continuous set of the photo-detectors of the second array designated by numerals "5" to "9" are positioned exactly within the length of each photo-detector of the extra first array 431X. The arranged array of the position detector 430 operates to provide a position signal indicating the location of the bean spot S on the arrays in the following manner. When the second array 432 outputs one of numerals "0" to "4" as indicating the beam spot S on the second array 432, then the output from the first array 431 is selected to find a particular numeral for the photo-detector in that array receiving a significant light energy so that the particular numeral of the first array 431 is combined with the numeral of the second array 432 to provide the two-digit coded position signal, for example, "40" for the illustrated location of the beam spot S in the figure, in which numeral "4" is the output from the first array 431 and "0" is from the second array. On the other hand, when the second array 432 outputs one of numerals "5" to "9", the output from the extra first array 431X is selected to find a particular numeral for the photo-detector in that array responsible for receiving a significant light energy so that the particular numeral is combined with the numeral of the second array to provide the two digit coded signal, for example, "39" in which "3" is the output from the extra first array 431X and "9" from the second array 432. With the array arrangement of FIG. 30, it is possible to reliably locate the beam spot S irrespective of whether the beam spot S extends over the adjacent photo-detectors of the first or the extra first arrays and to easily provide the two-digit position signal without the necessity of comparing the light energy received respectively by the adjacent photo-detectors, in the same way as in the array arrangement of FIG. 29.

It should be noted at this time that the array arrangements of FIGS. 29 and 30 and the output processing thereof are also found to be advantageous in excluding the erroneous reflections as discussed previously with reference to FIG. 28. Further, the above arrangements and the output processing thereof can be readily adapted in the position detector of the first embodiment while retaining the advantage of the first embodiment.

What is claimed is:

1. An optical measurement system for determination of an object profile comprising:

a light source for emitting a light beam;
light directing means for directing the light beam to scan a surface of said object surface;
position detecting means disposed to receive a light beam reflected from said object surface for obtaining position data with respect to individual scanned points on the object surface and for providing a position signal representing the position data; and
analyzing means for analyzing the position data supplied by the position signal so as to measure a series of distances to the individual scanned points on the object surface, the distances measured representing height data of the individual scanned points being analyzed to determine an object profile along the scanned point,
the position detecting means further including
a plurality of light receiving elements arranged in at least two linear arrays each extending in the direction of following the light beam from said object surface, the linear arrays disposed in side-by-side relation such that the light beam from the object surface provides a corresponding beam spot which straddles over said linear arrays,
each of the linear arrays being divided into plural subdivisions each including a limited number of the light receiving elements
each light receiving element forming each of the subdivisions in a first subdivision of said linear arrays being designated by a first value which is common to each subdivision and different between other light receiving elements of the subdivisions, such that the light receiving elements in the first array designated by the same first value are collectively coupled to produce a single first output indicating the first value when sensing the light beam,
the light receiving elements in each of the subdivisions forming a second subdivision of the linear arrays being designated respectively by second values which are different from other light receiving elements within the subdivision but are common to other light receiving elements between different subdivisions, said light receiving elements designated by the same second value in said second linear array being commonly coupled so as to provide a single second output indicating the second value when any one of the light receiving elements designated by the same second value senses the light beam, and means for providing the position signal in a coded form having at least a first digit of said first value indicating which one of the light receiving elements in the first array provides the first output and a second digit of the second value indicating which one of the light receiving elements in a given subdivision of the second array provides the second output.

2. An optical measurement system as set forth in claim 1, wherein the first array has the subdivisions each having a single light receiving element, and each one of the light receiving elements forming the first and second arrays is a photo-detector.

3. An optical measurement system as set forth in claim 1 or 2, wherein the light beam is a laser beam, and wherein said light directing means further comprises:

a beam expander adjacent to said light source for increasing the diameter of the laser beam, a first oscillating mirror which reflects and thereby redirects the light beam toward said object, said first oscillating mirror oscillating to have the reflected light beam oscillate for scanning of said object surface;

a first focusing lens interposed between said first oscillating mirror and said object to focus the reflected light beam on the said object;

a second oscillating mirror which redirects the reflected light from said object surface to said position detecting means, said second oscillating mirror oscillating in synchronism with said first oscillating mirror such that the reflected light from the scanned spots on said object surface can be received on the light receiving elements in the arrays; and a second focusing lens interposed between said object and said second oscillating mirror to focus the reflected light beam from said object surface on the light receiving elements.

4. An optical measurement system as set forth in claim 1 or 2, wherein said position detecting means determines which of the light receiving elements receives a maximum light energy to thereby identify the light receiving element having the maximum light energy as defining the beam spot.

5. An optical measurement system as set forth in claim 1 or 2, wherein said position detecting means is configured such that, when the light beam is received to straddle over the light receiving elements of the adjacent subdivisions of the first arrays, said position detecting means identifies, based upon a particular location of the light receiving element of the second array detected to receive the light beam, which one of the subdivisions of the first array has the light receiving element receiving the light beam, the first value designated the subdivision of the first array thus identified being combined with the second value designating the element in the second array receiving the light beam in order to provide the position signal.

6. An optical measurement system as set forth in claim 1 or 2, further including optical means for providing a pair of opposed first and second mirror images of said object surface, reversing the first mirror image, and overlapping the reversed first mirror image onto the second image to provide a composite image of said object surface which is to be focused on the arrays of the light receiving elements.

7. An optical measurement system as set forth in claim 1 or 2, further comprising a beam splitter for reflecting part of the light beam being directed to the scanned points on said object surface; and a scan spot tracing sensor which monitors the split part of the light beam to provide a timing signal indicating horizontal positions of the scanned points within a reference plane substantially perpendicular to a plane including the axes of the light beams directed to and reflected from said object surface, the timing signal being fed to said analyzing means where it is combined with the height data for determination of the object profile.

8. An optical measurement system as set forth in claim 7, wherein said scan spot tracing sensor includes a predetermined number of discrete photo-detectors which are arranged in a row extending in the direction of following the oscillating light beam, the photo-detectors being spaced by a closer interval toward a center of the row than at the opposite ends of the row.

9. An optical measurement system as set forth in claim 1 or 2, further comprising means for diverging the reflected light beam from said object surface to provide separate divergent light beams and focusing divergent light beams respectively on the individual arrays which are laterally spaced apart by a predetermined distance.

10. An optical measurement system for determination of an object profile comprising:

a light source emitting a light beam to said object;

light directing means for directing the light beam to scan a surface of said object surface;

position detecting means disposed to receive a light beam reflected from the object surface for obtaining position data with respect to individual scanned points on the object surface and for providing a position signal indicative of the position data; and analyzing means for analyzing the position data supplied in the form of the position signal to measure a series of distances to the individual scanned points on the object surface, the distance measured representing height data of the individual scanned points analyzed to determine an object profile along the scanned point, said position detecting means further including a plurality of light receiving elements arranged in at least two linear arrays each extending in the direction of following the light beam from said object surface, the linear arrays disposed in side-by-side relation such that the light beam from said object surface provides a corresponding beam spot which straddles over the linear arrays, each of the linear arrays being divided into plural subdivisions each having a limited number of light receiving elements, the light receiving elements in the subdivisions forming a first subdivision of the linear arrays being designated by first values which are common within each subdivision and are different from other light receiving elements between the different subdivisions, the light receiving elements in each of the subdivisions forming a second subdivision of said linear arrays being represented by second values which are different from other light receiving elements within the subdivision and are common to other light receiving elements between the different subdivisions, a plurality of first photo-detectors each coupled commonly to the light receiving elements which are designated by the same first value, each of the first photo-sensors being responsive to issue a first output when sensing the light beam at any one of the elements designated by the same first value, a plurality of second photo-detectors each coupled commonly to the light receiving elements which are designated by the same second value, each of the second photo-sensors being responsive to issue a second output when sensing the light beam at any one of the elements designated by the same second value, and means for providing the position signal in a coded form having at least a first digit of the first value indicating which one of the first photo-detectors issues the first output and a second digit of the second value indicating which one of the second photo-detectors issues the second output.

11. An optical measurement system as set forth in claim 10, wherein each of the light receiving elements is defined at one end face of an optical-fiber of which another end face is coupled to corresponding first and second photodetectors.

12. An optical measurement system as set forth in claim 11, wherein the one end face of the optical-fiber defining said light receiving element is inclined with respect to an optical axis of the optical-fiber at such an angle that the light beam entering light receiving element as satisfying the Scheimpflug condition is refracted to pass through the optical-fiber in parallel with the axis of optical fiber.

13. An optical measurement system for determination of an object profile comprising:

a light source for emitting a light beam;

light directing means for directing the light beam to scan a surface of said object surface;

position detecting means disposed to receive a light beam reflected from said object surface for obtaining position data with respect to individual scanned points on the object surface and providing a position signal indicative of the position data; and analyzing means for analyzing the position data supplied by the position signal to measure a series of distances to the individual scanned points on said object surface, the distances measured representing height data of the individual scanned points being processed to determine an object profile along the scanned point, said position detecting means further including a plurality of light receiving elements arranged in at least two linear arrays which extend in the direction of following the light beam from said object surface in side-by-side relation such that the light beam from said object surface provides a corresponding beam spot which straddles over the linear arrays, the linear arrays being divided into plural subdivisions which include predetermined numbers of the light receiving elements, each light receiving element forming each of the subdivisions in a first subdivision of said linear arrays being designated by a first value which differs from one subdivision to another subdivision, the light receiving elements in each of the subdivisions forming a second subdivision of said linear arrays being designated respectively by second values which are different form each other within the subdivision and are common to each other between the different subdivisions, the light receiving element designated by the same second value in the second linear array being commonly coupled so as to provide a single second output indicating the second value when any one of the light receiving elements designated by the same second value senses the light beam, means for providing the position signal in a coded form having at least a first digit of the first value indicating which one of the light receiving elements in the first array is receiving the light form said object surface and a second digit of the second value indicating which one of the light receiving elements in a given subdivision of the second array provides the second output, and means for evaluating the second output from the second linear array so as to select the first digit as corresponding to the location in the first array receiving the light from said object surface.

* * * * *